United States Patent [19]

Matsushita et al.

[11] Patent Number: 5,191,579
[45] Date of Patent: Mar. 2, 1993

[54] RING NETWORK SWITCHING CONTROL DEVICE

[75] Inventors: Akihiro Matsushita; Shinya Takemura, both of Oyama; Toshio Watanabe, Shimodate; Shigeo Sakai, Oyama; Nobuo Fukuda, Utsunomiya, all of Japan

[73] Assignee: Fujitsu Limited, Kawasaki, Japan

[21] Appl. No.: 539,901

[22] Filed: Jun. 18, 1990

[30] Foreign Application Priority Data

Jun. 17, 1989 [JP] Japan .................................. 1-153593

[51] Int. Cl.$^5$ ................................................. H04J 3/02
[52] U.S. Cl. .................................................. 370/85.15
[58] Field of Search ..................... 370/13, 15, 16.1, 17, 370/85.15, 85.2, 85.1

[56] References Cited

U.S. PATENT DOCUMENTS

| | | | |
|---|---|---|---|
| 4,196,321 | 4/1980 | Bosik ..................................... | 370/15 |
| 4,542,496 | 9/1985 | Takeyama et al. ................. | 370/16.1 |
| 4,575,843 | 3/1986 | David et al. ......................... | 370/16.1 |
| 4,648,088 | 3/1987 | Cagle et al. .......................... | 370/16 |
| 4,677,615 | 6/1987 | Orimo et al. ........................ | 370/16.1 |
| 4,710,915 | 12/1987 | Kitahara ............................. | 370/16.1 |
| 4,930,119 | 5/1990 | Kobayashi et al. ................. | 370/16.1 |

FOREIGN PATENT DOCUMENTS

| | | |
|---|---|---|
| 59-215152A | 5/1984 | Japan . |
| 2194713A | 3/1988 | United Kingdom . |

OTHER PUBLICATIONS

Radnor, Fiber Optic Lans: Technology Breakthroughs Up Their Potential, May 1989, 159 I&CS vol. 62, No. 5, PA., U.S.

Primary Examiner—Douglas W. Olms
Assistant Examiner—T. Samuel
Attorney, Agent, or Firm—Staas & Halsey

[57] ABSTRACT

A ring network switching apparatus connects a plurality of communication nodes by a duplex ring type transmission line. Respective communication nodes autonomously vary respective connection state by respective transmission line switching means based on the control data received from the control data receiving unit. Respective communication nodes transmit the control information designating a new transmission line state from the control information transmission unit. Thereby, respective communication nodes autonomously recover its failure and perform a re-construction of a network without an aid of a parent station. Further, the transmission data from the communication node is outputted to both transmission lines through a hybrid output section. Thus, respective communication nodes merely observe the state of the transmission line on the receiving side and switch the receiving switching means based on the observation. Therefore, the connection state of respective communication nodes can autonomously change, thereby providing a re-construction of a network at a high speed and simplifying a control circuit thereof.

17 Claims, 39 Drawing Sheets

| ITEM | FAILURE INFORMATION | CONTENTS |
|---|---|---|
| 1 | RX1 | · REDUCTION OF THE RECEIVE LEVEL IN $\lambda 1$ OR |
| 2 | RX2 | · REDUCTION OF THE RECEIVE LEVEL IN $\lambda 2$ OR |
| 3 | SEND1 | · RETURN INFORMATION OF RX2 TO THE OPPOSITE SIDE |
| 4 | SEND2 | · RETURN INFORMATION OF RX1 TO THE OPPOSITE SIDE |
| 5 | NG1 | · FAILURE INFORMATION OF $\lambda 1$ LOOP |
| 6 | NG2 | · FAILURE INFORMATION OF $\lambda 2$ LOOP |

Fig. 4

Fig. 7A(1)
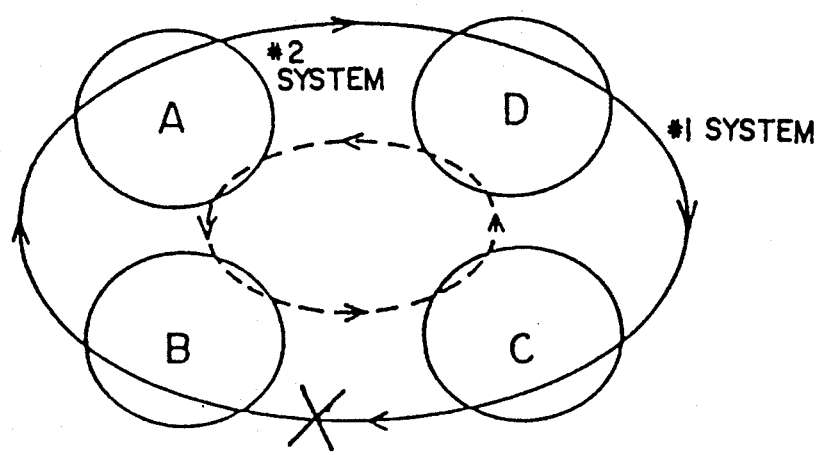
FAILURE CASE
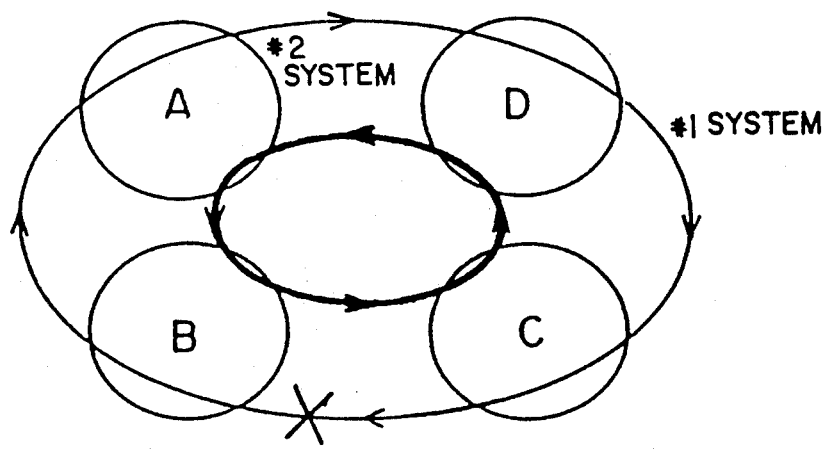
CIRCUMVENT STRUCTURE
Fig. 7A(2)

Fig. 7B(1)
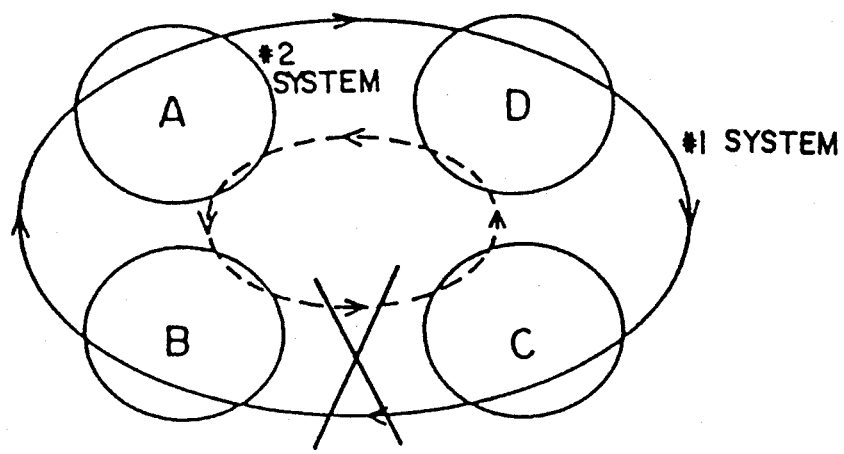
FAILURE CASE
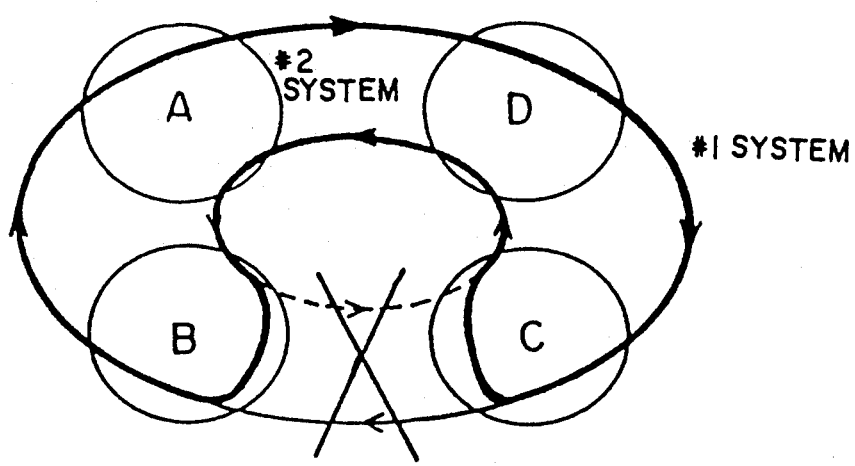
CIRCUMVENT STRUCTURE
Fig. 7B(2)

Fig. 7C(1)
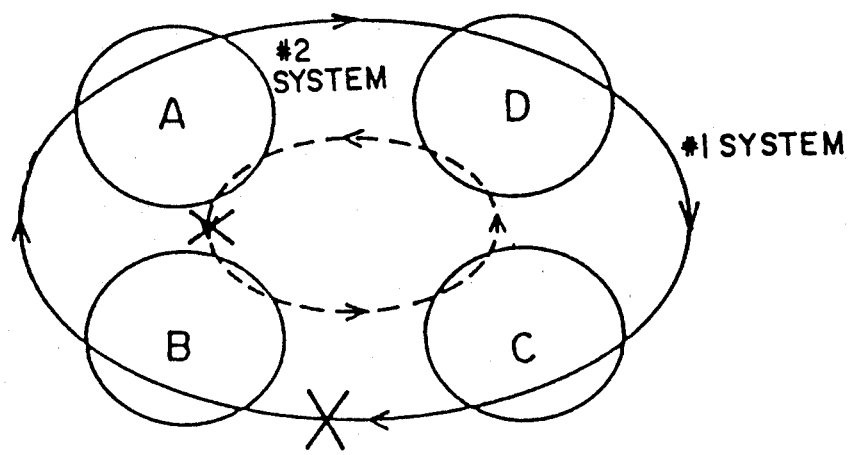
FAILURE CASE
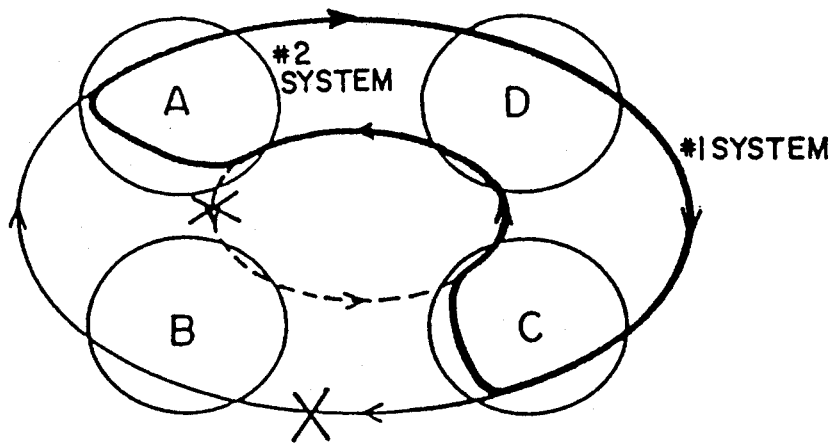
CIRCUMVENT STRUCTURE
Fig. 7C(2)

Fig. 7D(1)
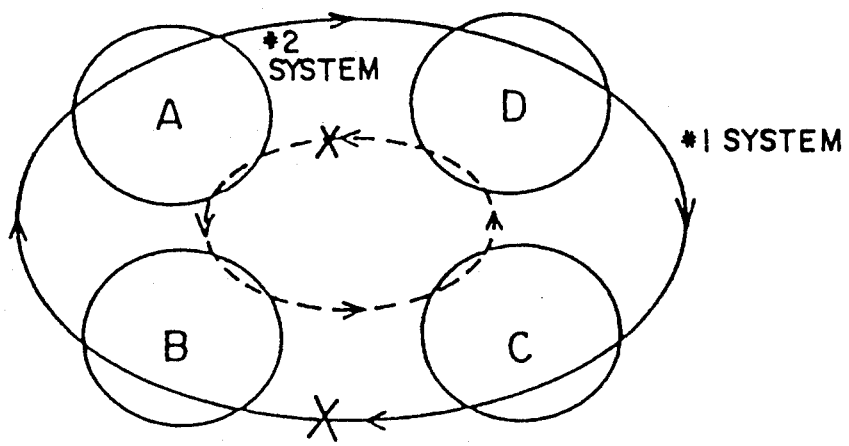
FAILURE CASE
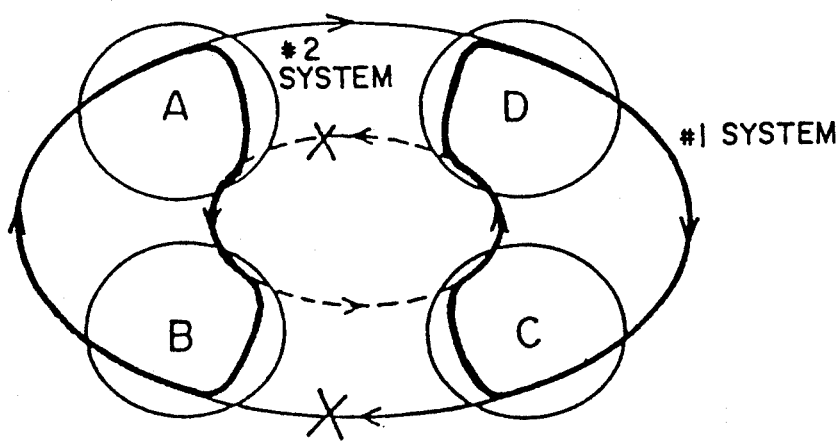
CIRCUMVENT STRUCTURE
Fig. 7D(2)

Fig. 7E(1)
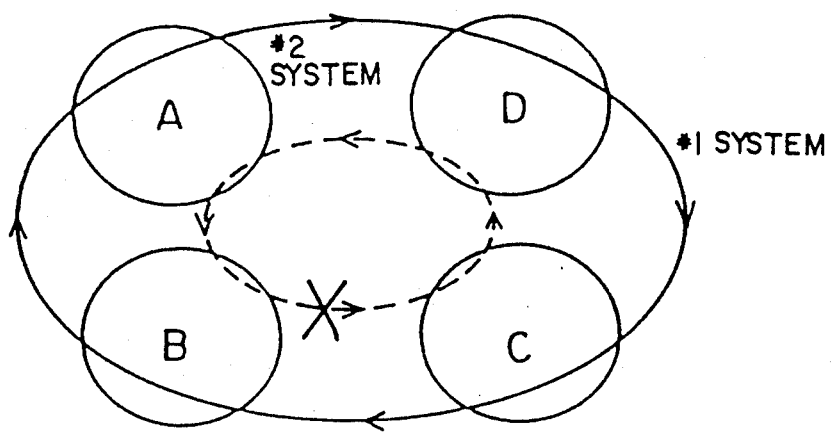
FAILURE CASE
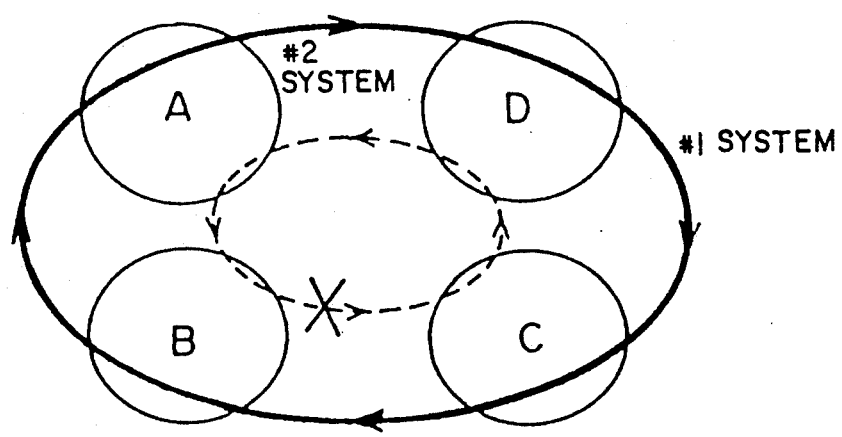
CIRCUMVENT STRUCTURE
Fig. 7E(2)

Fig. 7F(1)
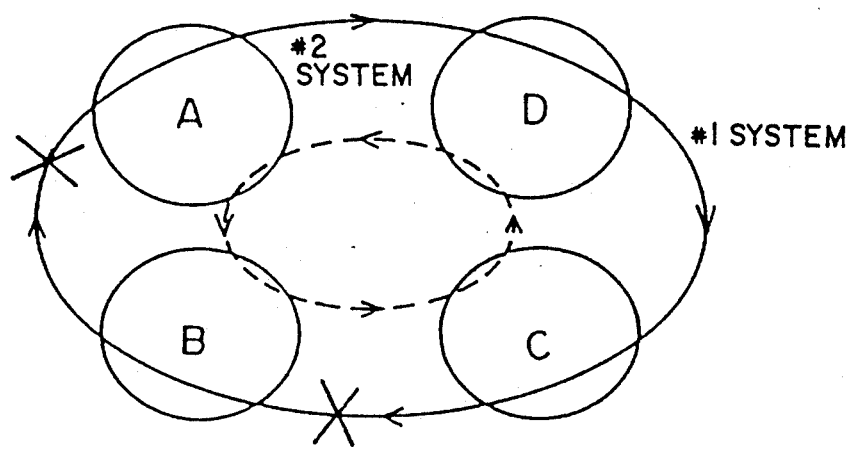
FAILURE CASE
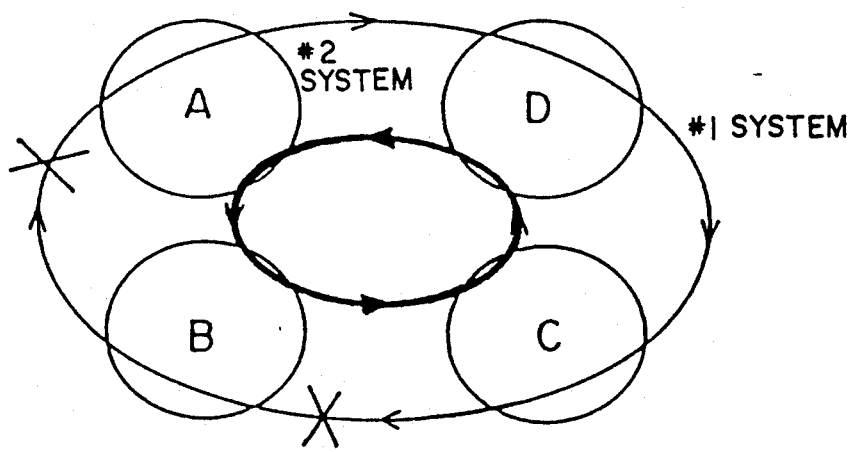
CIRCUMVENT STRUCTURE
Fig. 7F(2)

Fig. 7G(1)
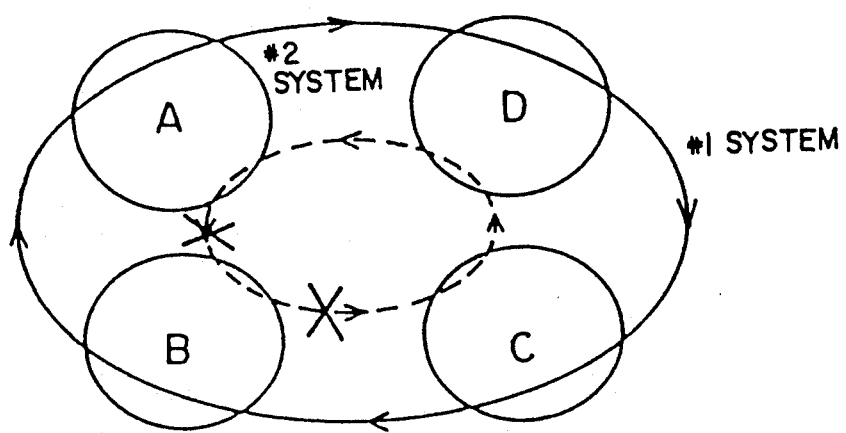
FAILURE CASE
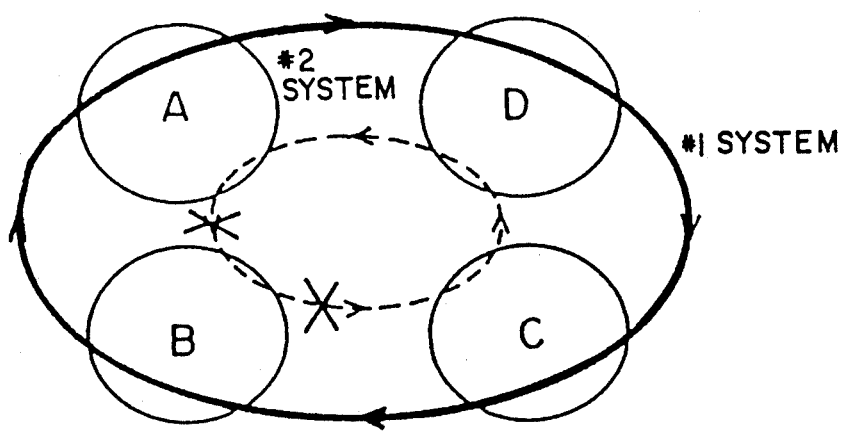
CIRCUMVENT STRUCTURE
Fig. 7G(2)

Fig. 7H(1)
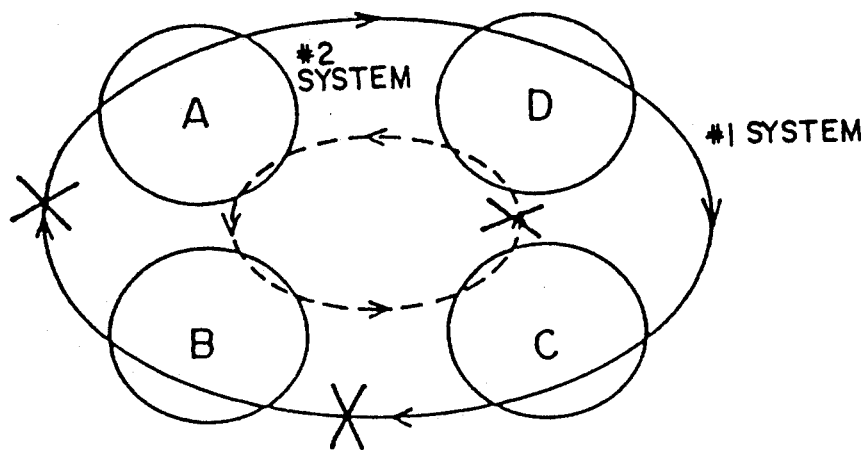
FAILURE CASE
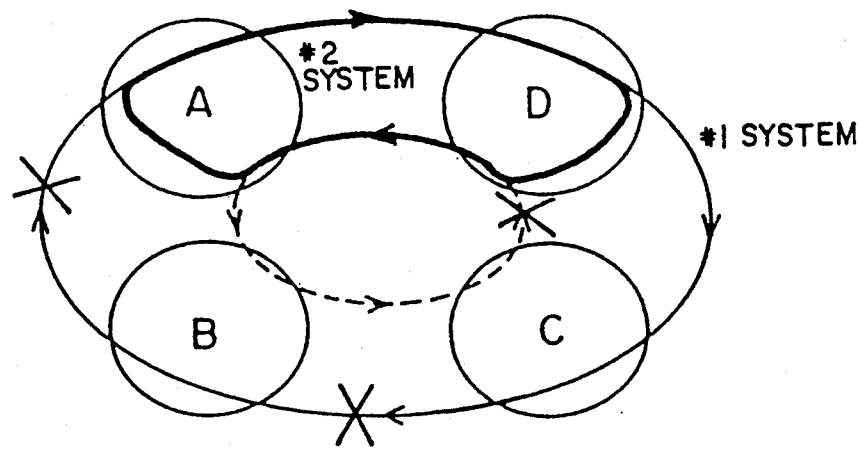
CIRCUMVENT STRUCTURE
Fig. 7H(2)

Fig. 71(1)
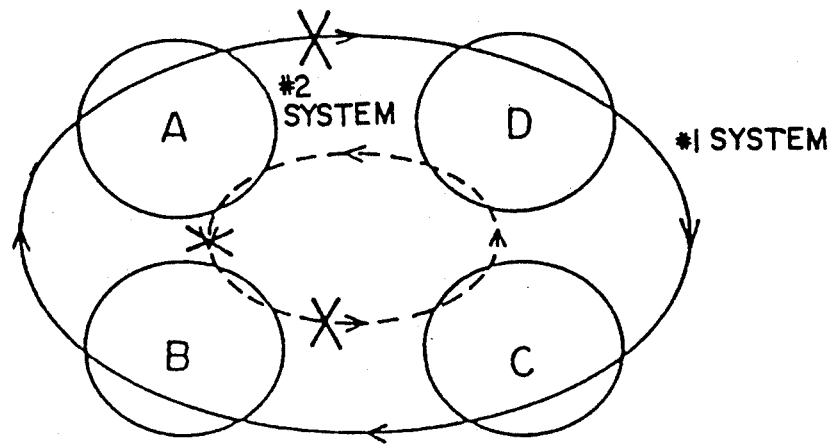
FAILURE CASE
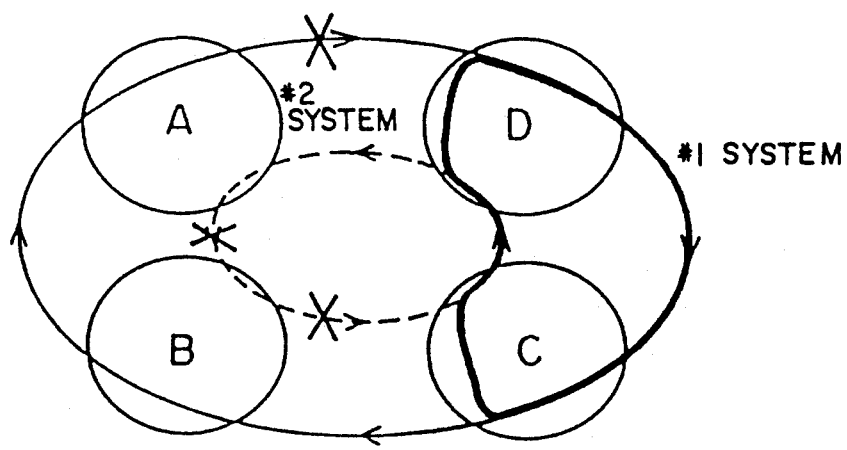
CIRCUMVENT STRUCTURE
Fig. 71(2)

RING NETWORK SWITCHING CONTROL DEVICE

BACKGROUND OF THE INVENTION

1. Field of the Invention

The present invention relates to a ring network which is applied to a local area network (LAN) and, more particularly, to a ring network switching control device for automatically reconfiguring a network in the event of a transmission-line failure by use of a duplex transmission line.

2. Description of the Related Art

Local area networks (LANs), in which a plurality of communication nodes (communication control devices which accommodate terminals and the like) are linked together via a transmission line in the form of a ring, thus allowing data interchange among distributed terminals and computers have been used widely.

In general, an advantage of duplex transmission lines is that, even when a fault occurs in one of the transmission lines, another transmission line can be used to continue the data communication and thus a reliable system is obtained.

Also, by forming the duplex transmission lines as two loops for transmitting data in reverse directions, even when both of the two lines are cut, or when a fault occurs in a node, the data communication can be maintained at a minimum scale of the system through a loop back.

In such a ring network, where a transmission-line failure and a change of state occur in a node, the transmission line is reconfigured.

In addition to the above-mentioned duplex line technology, when the system is recovered, it is necessary to reset the loop back or to expand the loop back to the recovered position of the system.

Based on the above, the present invention provides a system which enables the formation of a loop back and the resetting of each node (including a supervisory node), to obtain a flexible system operation.

As arts related to the present invention, the following publications are known:

1. U.S. Pat. No. 4,542,496 disclosing a conventional loop back control technology;
2. Japanese Unexamined Patent Publication (Kokai) No. 57-92,495 disclosing a prior art to the technology disclosed in the above U.S. Pat. No. 4,542,496;
3. Japanese Unexamined Patent Publication (Kokai) No. 59-40,739 disclosing a loop back technology with a supervisory unit; and
4. Japanese Unexamined Patent Publication (Kokai) No. 59-57,544 disclosing a loop back control without a supervisory unit. The art disclosed in this document is an alternative to that of the above Japanese Unexamined Patent Publication (Kokai) No. 59-40,739.

In the above related art, the parent station receives control information representing the state of transmission line 3 from respective communication nodes at regular intervals for centralized control of the entire state of the network. In the event of a failure, the parent station decides its state and transmits control information to each of communication nodes to control its switches (not shown), thereby switching between the #1 and #2 systems of transmission line 3 or performing a loopback of transmission line 3 for reconfiguration of the network. That is, the child stations, operate subordinately as prompted by the parent station.

In the above related art, however, a complex control procedure involving several stages or steps is required between the parent station and respective communication nodes in order to modify the configuration of the network system. This will waste a lot of processing time and consequently prolong the interruption of communication.

In addition, if a failure should occur in the parent station itself, the entire operation of the network will be stopped.

To solve the above problems, U.S. Pat. No. 4,930,119 (which corresponds to Japanese unexamined Kokai Publication 1-164,141) discloses a prior art for performing a communication control autonomously by enabling respective communication node to use the control data. The present invention is directed to a further specific and concrete technology for performing an autonomous control.

SUMMARY OF THE INVENTION

It is accordingly an object of the present invention to provide a ring network switching control device which, in the event of a transmission-line failure, permits each communication node to identify the transmission-line failure automatically and a network to be reconfigured automatically and quickly on the basis of simple distributed control.

The ring network switching control device of the present invention is used with a ring network in which a plurality of communication nodes are connected one after the other in a ring via a duplexed transmission line.

According to a first aspect of the present invention, each of the communication nodes comprises:

a control information transmitting section for transmitting control information representing the state of its associated transmission line to another communication node via its associated transmission line;

a control information receiving section for supervising the state of its associated transmission line and receiving control information from another communication node via its associated transmission line;

a transmission line switching section for switching the connecting state of its associated transmission line; and a control section for prompting the transmission line switching means to perform switching ,control and the control information transmitting section to transmit new control information in accordance with the results of the supervision of the state of the transmission line and the reception of the control information by the control information receiving section.

According to a second aspect of the present invention, each of the communication nodes comprises:

a hybrid output section for outputting transmission data to two transmission lines on a hybrid basis;

a supervising section for supervising an alarm on the receiving side of each transmission line;

reception switching means for switching a transmission line to receive data; and a control section for performing switching control on the reception switching means on the basis of the supervised state by the supervising section.

In the configuration according to the first or second aspect of the present invention, a control operation corresponding to a change of state in the network is performed under distributed control of each communication node.

According to the first aspect of the present invention, each of the communication nodes changes its connecting state independently or autonomously using control information, thus permitting automatic recovery from a failure and reconfiguration of the network without any assistance of the parent station.

According to the second aspect of the present invention, because transmission data from each communication node is always output to both transmission-line systems via the hybrid outputting means, there is no need to switch the transmitting side at the occurrence of a failure. Therefore, each communication node has only to supervise the state of the transmission line on the receiving side and switch the reception switching means on the basis of the result of the supervision for independent change of its connecting state and quick reconfiguration of the network. The control circuit can also be made simple.

BRIEF DESCRIPTION OF THE DRAWINGS

FIG. 4 is a diagram for explaining failure information;

FIGS. 6A through 6I illustrate inter-station connecting states in the first embodiment;

FIGS. 7A through 7I are conceptual diagrams of the first embodiment;

DESCRIPTION OF THE PREFERRED EMBODIMENTS

Figure 1A:
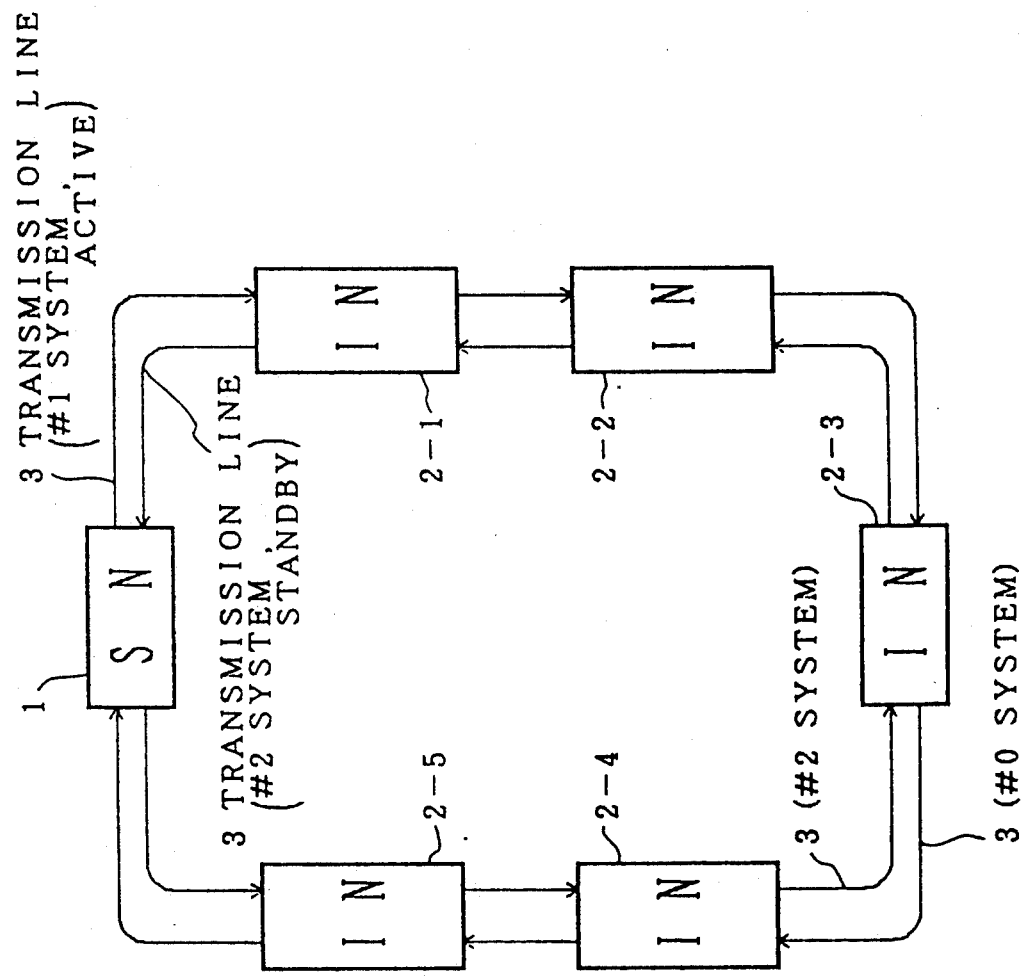
FIGS. 1A, 1B and 1C illustrate a configuration of a ring LAN using a duplexed transmission line.
Figure 1B:
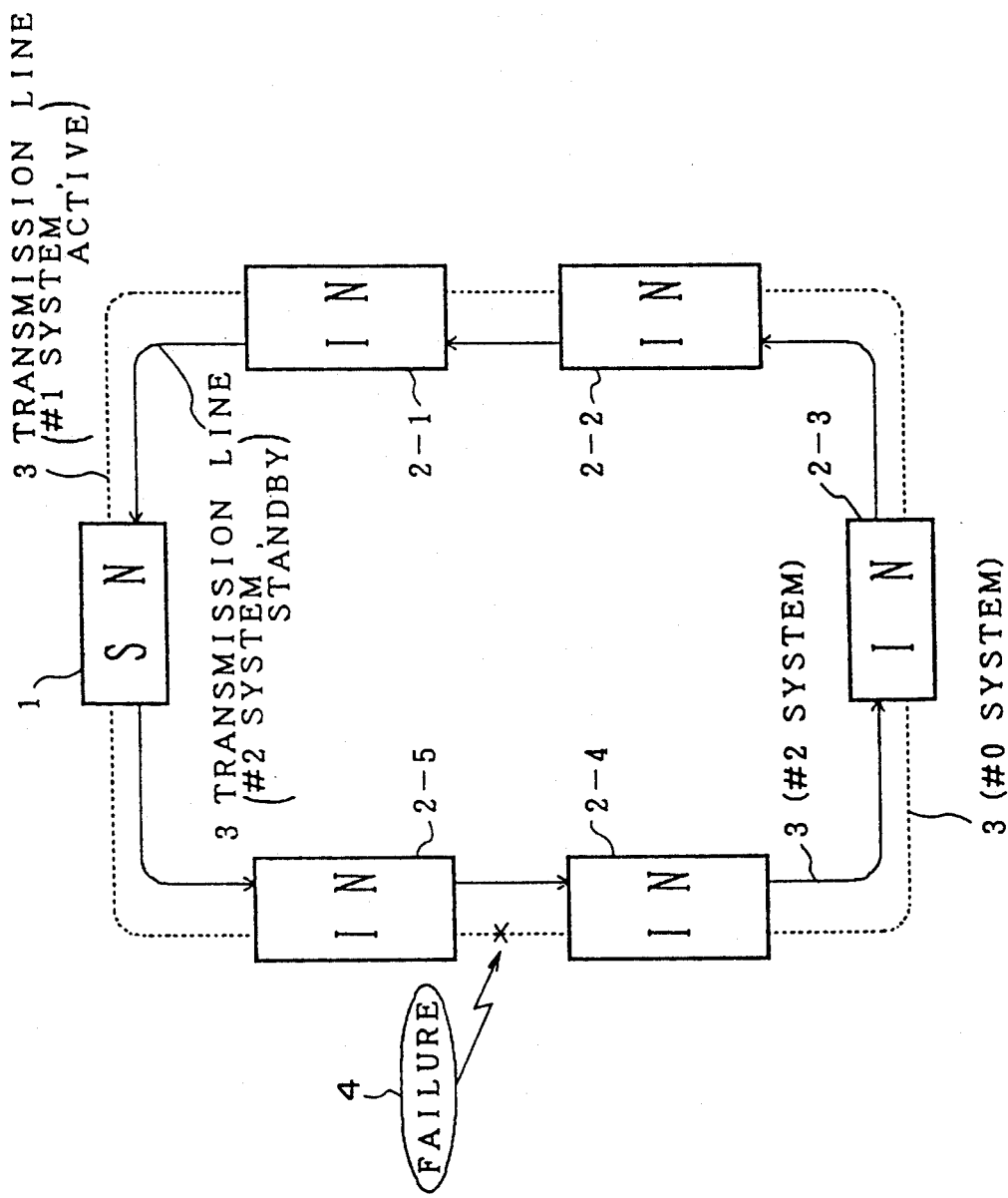
Figure 1C:
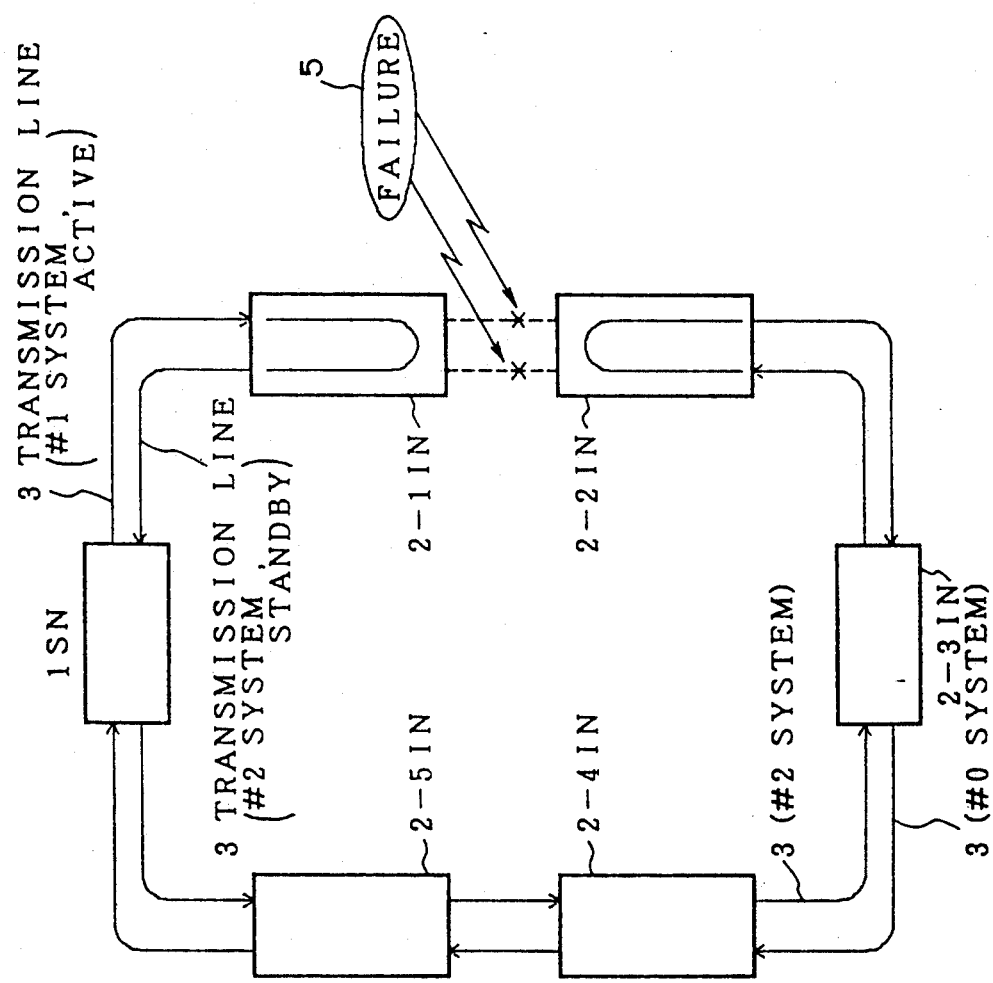

FIG. 1A illustrates a general configuration of a ring network. A supervisory node (hereinafter abbreviated to SN) 1, a parent station, and a plurality of communication nodes (hereinafter abbreviated to INs) 2-1 to 2-5, child stations, are linked in a ring by a transmission line 3 formed of a duplexed optical fiber cable with #1 and #2 systems. Data communication is allowed among INs 2-1 to 2-5 by employing, for example, the #1-system transmission line. The #2-system transmission line is employed as a standby system.

Where a failure 4, such as a disconnection, occurs in #1-system transmission line 3 between IN 2-4 and IN 2-5, as illustrated in FIG. 1B, transmission line 3 is switched to the standby #2-system transmission line for subsequent operation. Where failures occur in both the #1 and #2 systems of transmission line 3 between IN 2-1 and IN 2-2, as shown in FIG. 1C, transmission line 3 is looped back from the #1 system to the #2 system at IN 2-1, and likewise transmission line 3 is looped back from the #2 system to the #1 system so that the network is reconfigured for subsequent operation. The first principle Referring now to FIG. 2A, which is a block diagram illustrating a first principle of the present invention, a plurality of communication nodes $6a$, $6b$, $6c$, . . . are linked in the form of a ring by duplexed transmission lines 7-1 and 7-2. These transmission lines are implemented as a LAN (local area network) formed of, for example, optical fiber cables.

Communication node $6a$ comprises various sections which will be described below. Note that the other communication nodes $6b$, $6c$ and so on have the same configuration.

First, control information transmitting sections $9a$-1 and $9a$-2 are provided. These sections transmit control information $8j$-1 and $8j$-2 representing the states of transmission lines 7-1 and 7-2 to communication nodes $6b$ and $6c$ via transmission lines 7-1 and 7-2, respectively.

Secondly, control information receiving sections $10a$-1 and $10a$-2 are provided. These sections supervise the states of transmission lines 7-1 and 7-2, for example, receive levels, and receive control information $8i$-1 and $8i$-2 from communication nodes $6b$ and $6c$, respectively.

Thirdly, a transmission line switching section $11a$ is provided. This section switches the connecting state of each of transmission lines 7-1 and 7-2. It switches between transmission lines 7-1 and 7-2 to determine which of them is to be supplied with transmit or receive data within communication node $6a$. It also performs such connection switching operations as short circuiting the input side and output side of each of transmission lines 7-1 and 7-2 so as to allow communication data on the transmission lines to merely pass, or loops the transmission line from 7-1 back to 7-2 or from 7-2 back to 7-1.

Finally, a control section $12a$ is provided. This section prompts transmission line switching section $11a$ to perform a switching operation and control information transmitting section $9a$-1 and $9a$-2 to transmit new control information $8j$-1 and $8j$-2 on the basis of results of the supervision of each of the transmission lines and the reception of control information $8i$-1 and $8i$-2 by control information receiving sections $10a$-1 and $10a$-2.

Figure 2A:
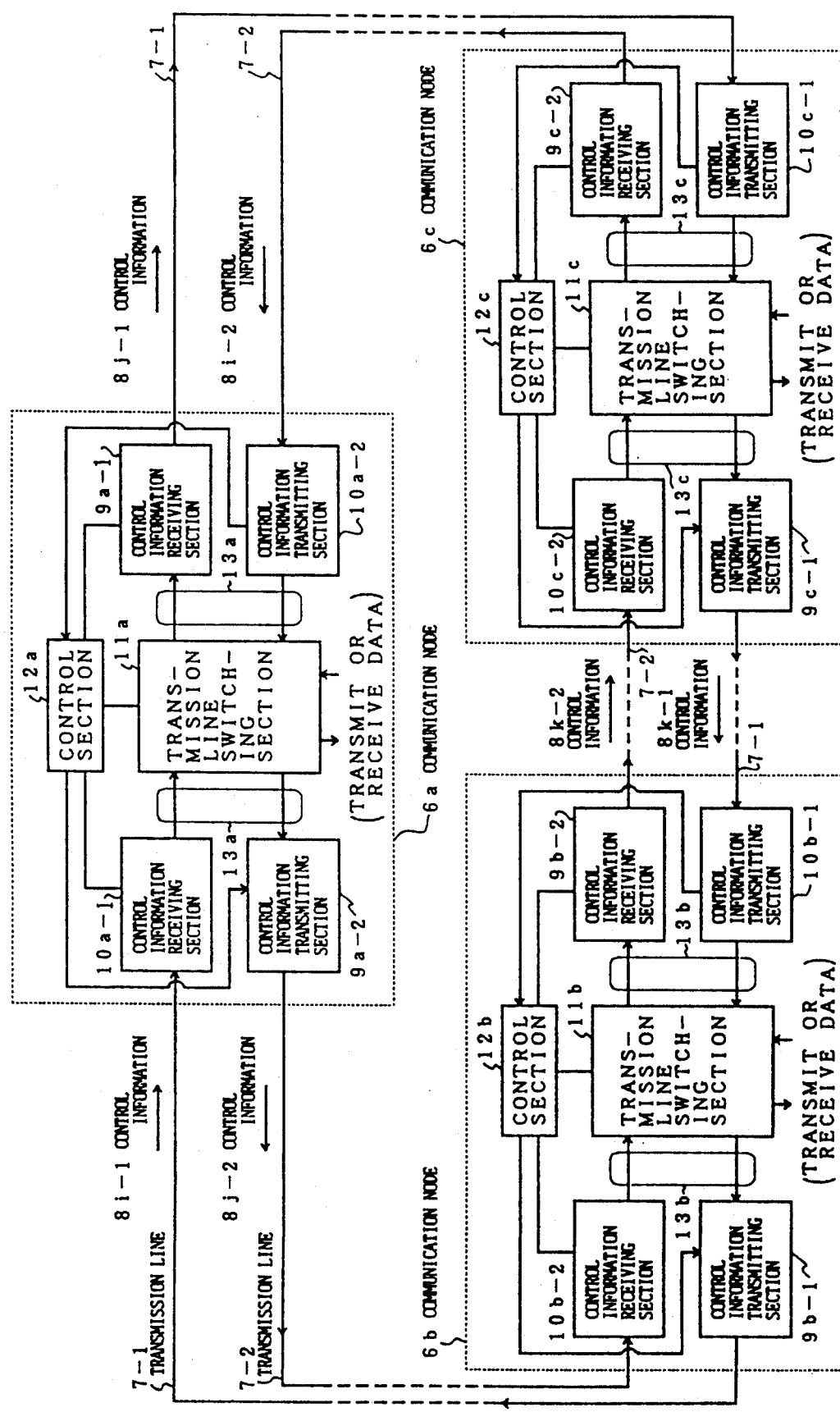
FIG. 2A is a first basic block diagram of the present invention.

The above configuration also applies to the other communication nodes $6b$ and $6c$, in which corresponding sections are designated by like reference characters with subscripts "b" or "c" as shown in FIG. 2A. Control information $8k$-1 and $8k$-2 is transmitted between communication nodes $6b$ and $6c$.

In FIG. 2A, where a failure occurs somewhere on transmission lines 7-1 or 7-2, the receive level of information transmitted over these transmission lines or the state of reception of control information $8i$-1 or $8i$-2 in control information receiving sections $10a$-1 or $10a$-2 will vary in communication node $6a$ for example. Control section $12a$ thereby controls the connecting state of the transmission lines in transmission line switching section $11a$ in accordance with predetermined rules. Also, control section $12a$ prompts control information transmitting sections $9a$-1 and $9a$-2 to transmit new control information corresponding to the state in accordance with predetermined rules. The above operation also applies to the other communication nodes $6b$ and $6c$.

Figure 2B:
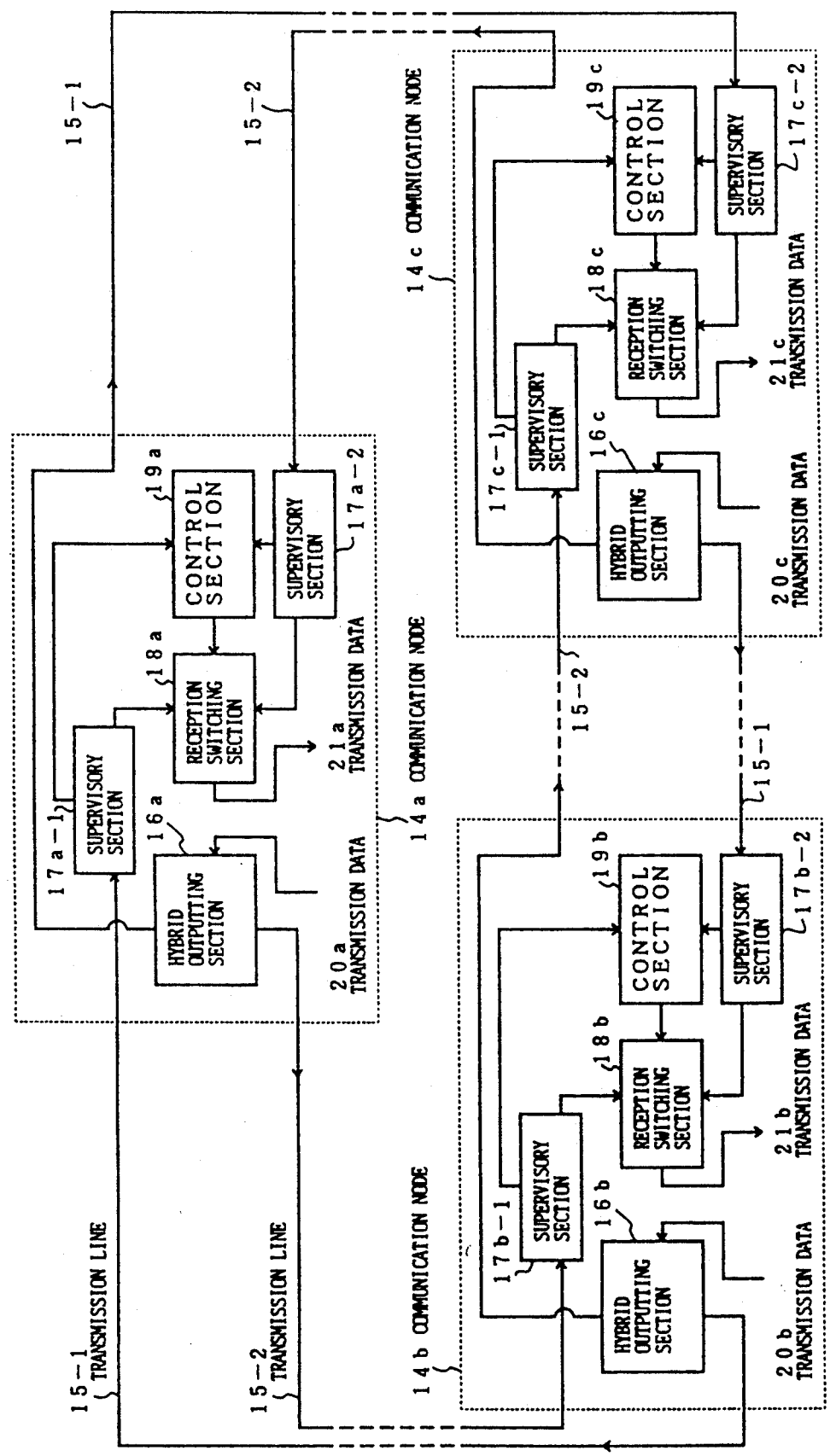
FIG. 2B is a second basic block diagram of the present invention.

As described above, the connecting state of each communication node is changed independently, thus permitting automatic reconfiguration of the network without any assistance from the parent station. In this case, the switching rules for the connecting state in transmission line switching section $11a$ corresponding to changes of state in incoming control information $8i$-1 and 8*i*-2, and the changing rules corresponding to the switching rules for control information 8*j*-1 and 8*j*-2 in control information transmitting section 9*a*-1 and 9*a*-2 can be determined uniquely in advance. For this reason, control section 12*a* may store these rules in the form of a table. If it does, when a change of state occurs, control section 12*a* has only to refer to the table for the transition to a new state. This simple control will permit the above operation to be achieved and the network to be reconfigured quickly. The above rules may be implemented by hard-wired logic, such as sequential circuits, for faster control. The second principle FIG. 2B is a second block diagram of the present invention. As in FIG. 2A, a plurality of communication nodes 14*a*, 14*b*, 14*c* and so on are sequentially connected in a ring by duplexed transmission lines 15-1 and 15-2, thereby forming a ring network.

Communication node 14*a* comprises various sections which will be described below. The other communication nodes have the same configuration as communication node 14*a*, as shown.

Firstly, a hybrid outputting section 16*a* is provided. This section outputs transmission data 20*a* to be communicated to other communication nodes 14*b* and 14*c*, to two transmission lines 15-1 and 15-2 in a hybrid manner (simultaneously). That is, in the second principle, transmission data 20*a* is outputted to both transmission lines 15-1 and 15-2 unconditionally.

Secondly, supervisory sections 17*a*-1 and 17*a*-2 are provided. These sections supervise an alarm on the receiving sides of transmission lines 15-1 and 15-2. They perform a supervision to determine whether or not data can be received from their corresponding respective transmission line 15-1 or 15-2 within a specified period. If data cannot be received, the section gives an alarm indicating a failure in the transmission line.

Thirdly, a reception switching section 18*a* is provided. This section switches between the transmission lines to receive data 21*a*.

Finally, a control section 19*a* is provided. This section performs switching control on reception switching section 18*a* on the basis of the supervised states by supervisory sections 17*a*-1 and 17*a*-2.

The above configuration also applies to communication nodes 14*b* and 14*c*, in which corresponding sections are designated by like reference characters with subscripts "b" or "c".

Though not illustrated, a switching control section may be provided for performing a connection switching operation such as short-circuiting the input and output sides of transmission lines 15-1 and 15-2 to simply allow communication data on the transmission lines to pass, or loops the transmission line from 15-1 back to 15-2 or from 15-2 block to 15-1. If it does, communication node 14*a* will be allowed to have the function of a transit node as well as the function of a communication node adapted to transmit data 20*a* and receive data 21*a*.

In the block diagram of the second principle, if a failure occurs somewhere in transmission lines 15-1 and 15-2, supervisory section 17*a*-1 or 17*a*-2 in communication node 6*a* will give an alarm indicating that data cannot be normally received from the transmission line. In response, control section 19*a* controls reception switching section 18*a*. That is, with data 21*a* received from transmission line 15-1 through supervisory section 17*a*-1 and reception switching section 18*a*, if supervisory section 17*a*-1 gives an alarm indicating that data cannot be normally received, control section 19*a* switches reception switching section 18*a*. Thereafter, data 21*a* is received from transmission line 15-2 through supervisory section 17*a*-2 and reception switching section 18*a*. The above operation also applies to other communication nodes 6*b* and 6*c*.

In the above operation, since transmission data 20*a* is always outputted onto both transmission lines 15-1 and 15-2 through hybrid outputting means 16*a*, there is no need to switch the transmission side. In the configuration of FIG. 2, therefore, there is no need to transmit control information among the communication nodes. Each communication node has only to supervise the state of the transmission line on the receiving side and correspondingly switch reception switching section 18*a* in order to independently change its respective connecting state and quickly reconfigure the network.

A FIRST PREFERRED EMBODIMENT

Figure 3:
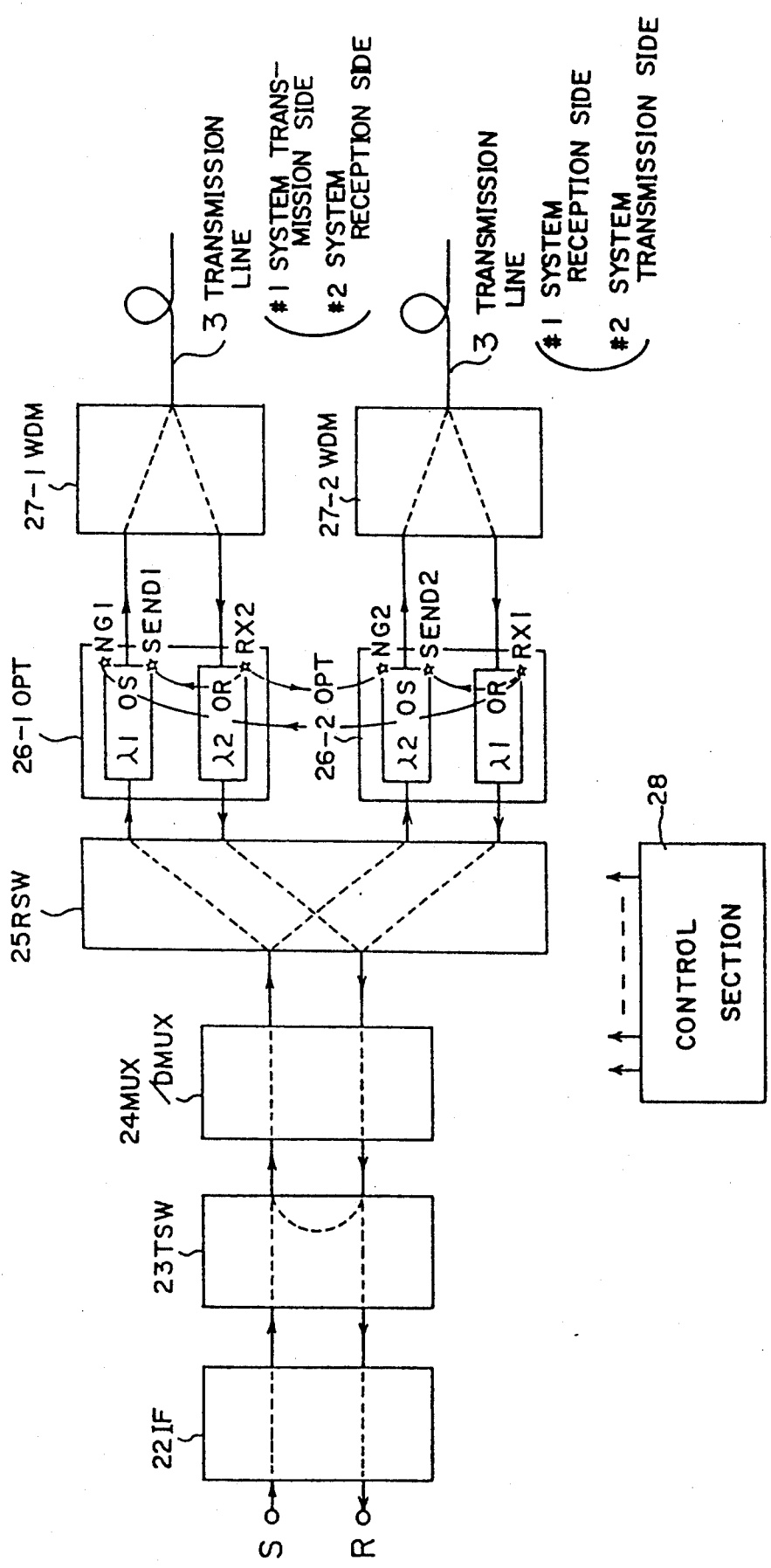
FIG. 3 is a block diagram of a first embodiment of the present invention.

FIG. 3 illustrates a configuration of a first preferred embodiment of the present invention. It illustrates the configuration of each of the communication nodes IN 2-1 to IN 2-5 in a general ring type of LAN as shown in FIGS. 1A to 1C. Since the present embodiment is not directed to a system in which the network is reconfigured under centralized control of supervisory node SN 1, the configuration of SN 1 will not be referred to in particular.

In FIG. 3, transmission line 3 (refer to FIGS. 1A to 1C) has a #1-system transmission line for transmission, a #2-system transmission line for reception, a #1-system transmission line for reception and a #2-system transmission line for light-wavelength division multiplexed in one optical fiber cable, the #1 system being multiplexed using a wavelength of $\lambda 2$. Of course, the #1 and #2 systems may be formed of separate optical fiber cables.

Multiplexing section (hereinafter referred to as WDM) 27-1 multiplexes a #1-system transmission output from #1-system electricity-to-light conversion section $\lambda 10S$ of optical conversion section (hereinafter referred to as OPT) 26-1 on transmssion line 3 and demultiplexes a #2-system receive input from transmission line 3 for application to #2-system light-to-electricity conversion section $\lambda 20R$ or OPT 26-1. WDM 27-2 also performs this operation on a #1-system receive input and a #2-system transmit output among #1-system light-to-electricity conversion circuit $\lambda 10R$, #2-system electricity-to-light conversion circuit $\lambda 20S$ and transmission line 3.

$\lambda 10S$ or $\lambda 20S$ in OPT 26-1 or 26-2 converts an electric output signal from a ring switch (hereinafter referred to as RSW) 25 to a light signal having a wavelength of $\lambda 1$ or $\lambda 2$ for application to WDM 27-1 or 27-2.

$\lambda 10R$ or $\lambda 20R$ in OPT 26-1 or 26-2 converts a light input signal having a wavelength of $\lambda 1$ or $\lambda 2$ from WDM 27-1 or 27-2 to an electric signal for application to RSW 25.

RSW 25 selectively connects the input and output of multiplexing/demultiplexing section (hereinafter referred to as MUX/DMUX) 24 to either OPT 26-1 or OPT 26-2. In other words, RSW 25 determines which of the #1 system or #2 system transmission lines is to be connected to MUX/DMUX 24. Also, RSW 25 may connect $\lambda 10R$ and $\lambda 10S$ or $\lambda 20R$ and $\lambda 20S$ directly.

MUX/DMUX 24 multiplexes or demultiplexes a time-division multiplexed signal having a transmission rate of 32 Mbps which is transmitted between time switch (hereinafter referred to as TSW) 23 and RSW 25.

TSW 23 determines which of 480 channels of the time-division multiplexed signal of 32 Mbps in transmission rate is to be allotted to an input/output signal having a transmission rate of 64 kbps in interface (hereinafter referred to as IF) 22. For other channels which are not allotted to the signal, TSW 23 directly connects its receive input from MUX/DMUX 24 to its transmit output to MUX/DMUX 24.

IF 22 is an interface circuit adapted to make a a connection between a transmission signal S from or a receive signal R to a terminal not shown and TSW 23.

Control section 28 performs the entire control of IF- 22, TSW 23, MUX/DMUX 24, RSW 25 and OPTs 26-1 and 26-2.

The operation of the first embodiment is described below.

First, six pieces of failure information, as shown in FIG. 4, are employed in the communication node configured as shown in FIG. 3.

Control section 28 supervises whether or not receive signals, which are light signals, are normally received by λ10R and λ20R in OPT 26-1. Suppose the state in which a reduction in the receive level of the light signal is detected in λ10R to be RX1 and the state in which a reduction in the receive level of the light signal is detected in λ20R to RX2.

On detection of RX1, namely, a reduction in the receive level of the #1 system receiving side, control section 28 first outputs via λ20S return information SEND2 of RX1 to the #2 system transmission side. This output is in the direction of the input signal whose receive level is detected. At the same time, control section 28 outputs failure information NG1 of the #1 system transmission line (λ1 loop) to the #1 system transmission side corresponding to RX1.

Likewise, on detection of RX2, namely, a reduction in the receive level of the #2 system receiving side, control section 28 first outputs via λ10S return information SEND1 of RX2 to the #1 system transmission side. This output is in the direction of the input signal whose receive level is detected. At the same time, control section 28 outputs failure information NG2 of the #2 system transmission line(λ2 loop) to the #2 system transmission side corresponding to RX2.

In a communication node which has not yet detected RX1 or RX2, when control section 28 receives failure information NG1 from the next node via λ10R on the #1 system receiving side, it outputs via λ10S the failure information NG1 as it is to the #2 system transmitting side. This output is in the direction of the input signal.

In the above operation, the six types of failure information of FIG. 4 will have a fixed pattern depending on the failure conditions in transmission line 3. How to set the connection state of RSW of FIG. 3 for each of the failure conditions may be determined in advance. In the present embodiment, this property is used by control section 28 in each communication node to control the connecting state of RSW 25 on the ba sis of six types of failure information of FIG. 4 and in accordance with the following conditions.

Figure 5A:
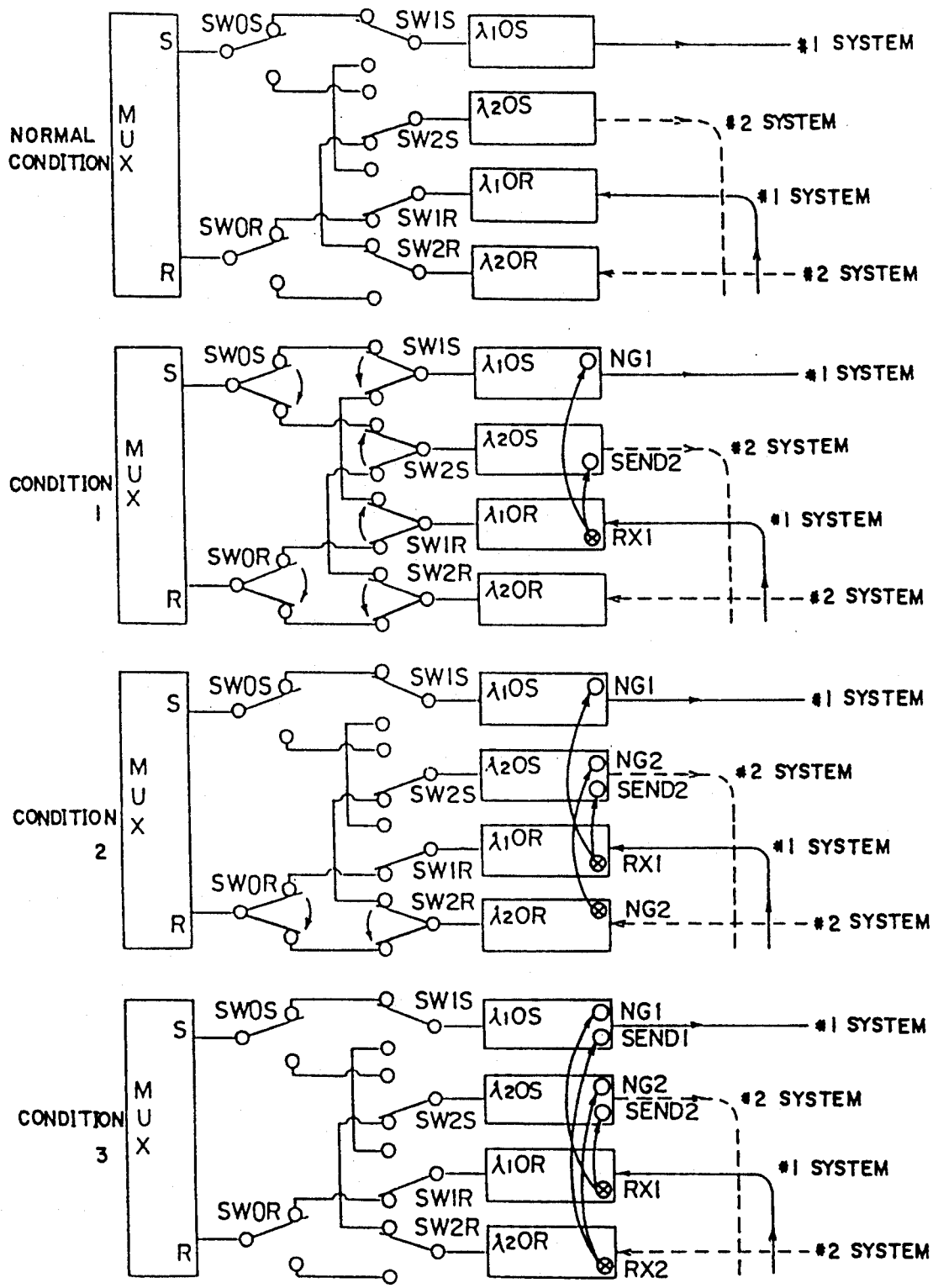
FIGS. 5A through 5E illustrate connecting patterns in the first embodiment.
Figure 5B:
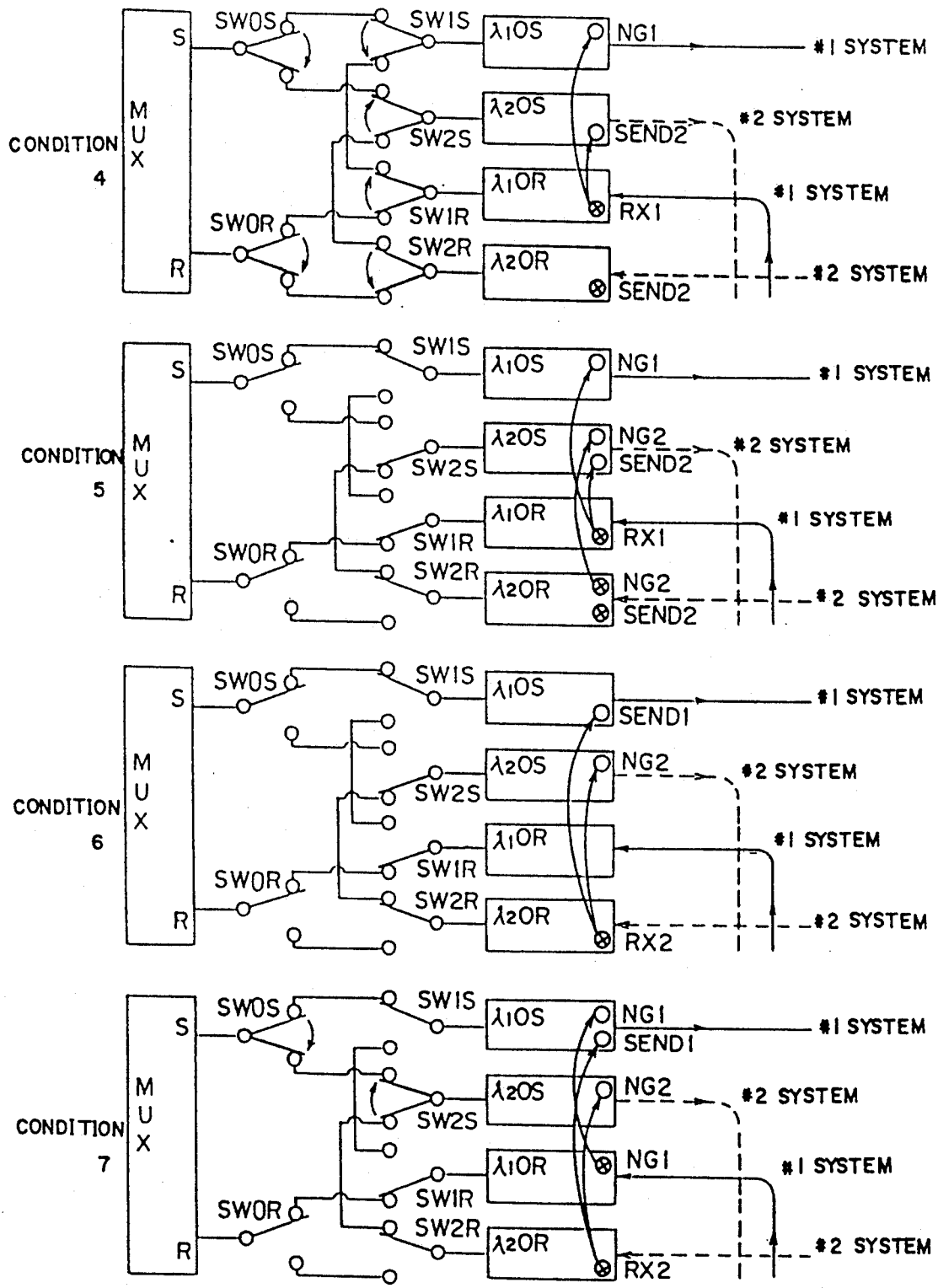
Figure 5C:
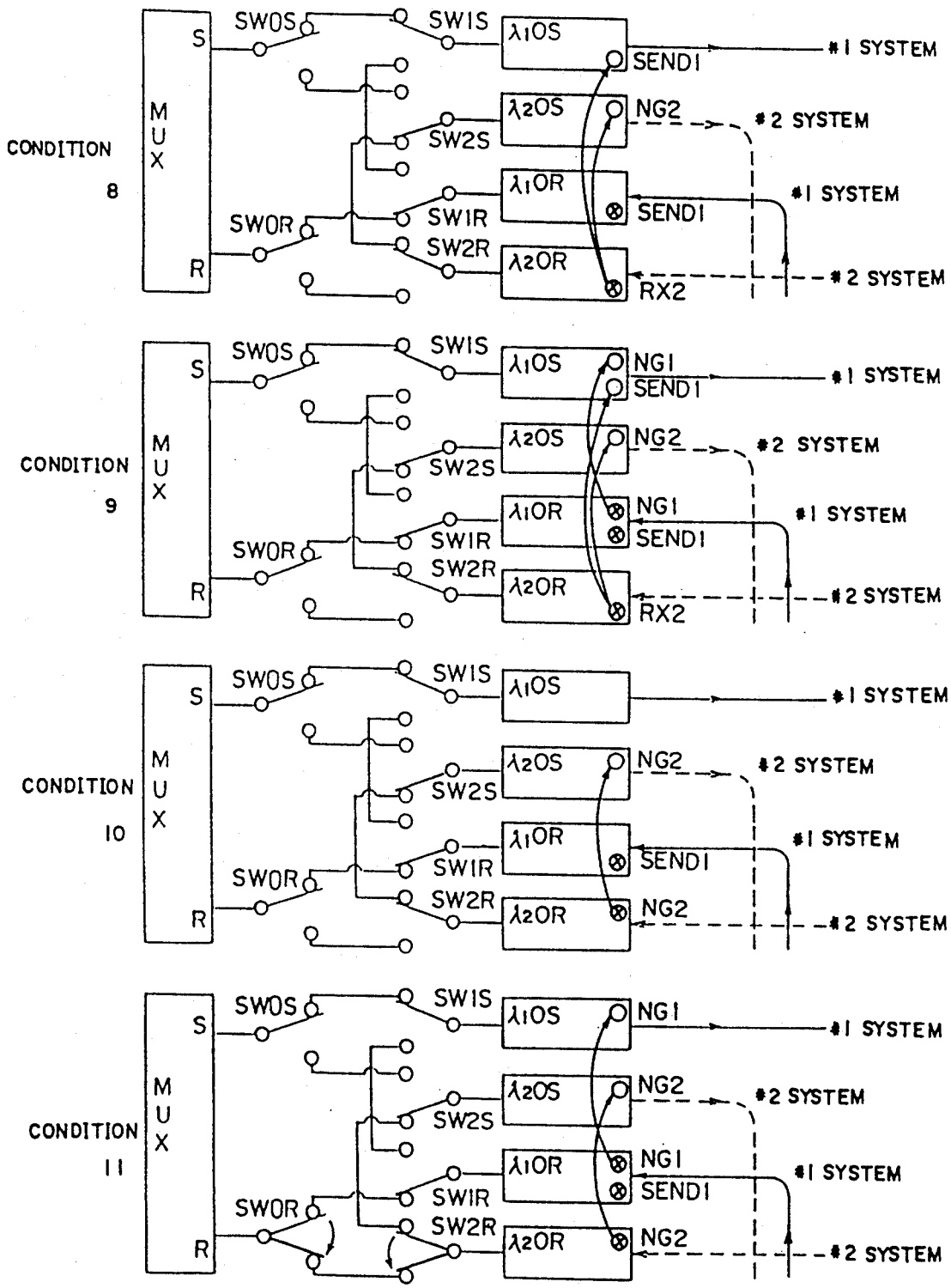
Figure 5D:
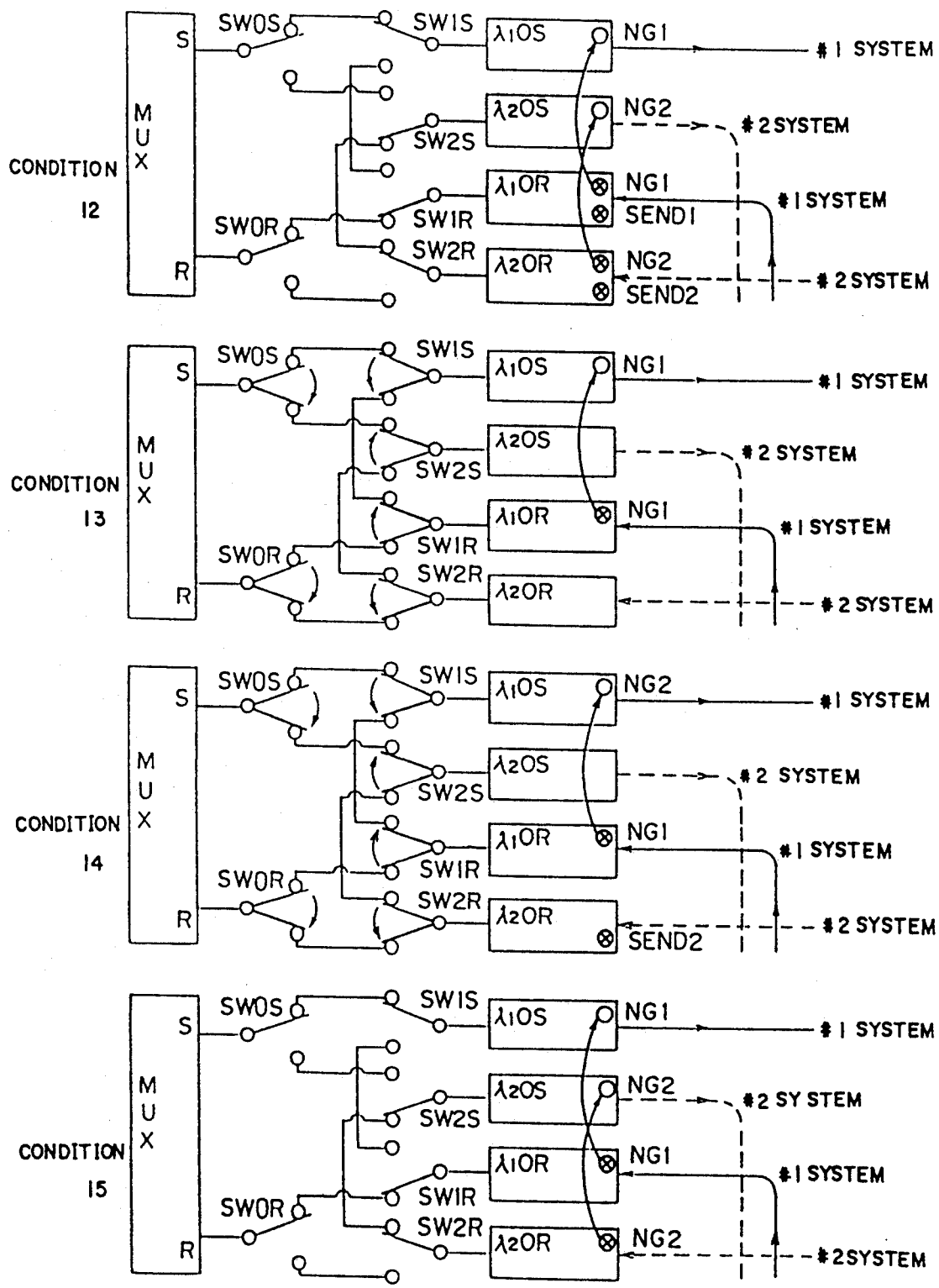

First, in the normal operating condition, the connecting state of each communication node is shown at the top of FIG. 5A. In this figure, the circuit designated by MUX corresponds to MUX/DMUX 24 of FIG. 3. SW0S, SW2S, SW0R, SW1R and SW2R conceptually represent the connecting states of transmission and receive signals in RSW 25. As shown, in the normal condition, an input received from the #1 system transmission line is entered into MUX/DMUX24 via λ10R, SW1R and SW0R, while a transmission output of MUX/DMUX 24 is output to the #1 system transmission line via SW0S, SW1S and λ10S. That is, the #1 system is employed. At this point, λ20R and λ20S are short-circuited by SW2R and SW2S.

If a failure occurs in these operating conditions when the #1 system is employed, the connecting patterns in RSW 25 and the output patterns of failure information from λ10S or λ20S will have 17 types of patterns represented by condition 1 through condition 17, as illustrated in FIGS. 5A through 5E. Theoretically, $2^6$ conditions can occur as a result of combinations of six types of failure information, as shown in FIG. 4. However, seventeen following conditions actually occur.

For example, condition 1 of FIG. 5A corresponds to the case where the state RX1, which represents a reduction in the receive level of the #1 system receiving side, is detected. In this case, the connecting states are changed as shown and, at the same time, failure information NG1 is output from λ10S to the #1 system transmitting side and return information SEND2 is output from λ20S to the #s system transmission side. This also applies to conditions 2 through 17.

Figure 5E:
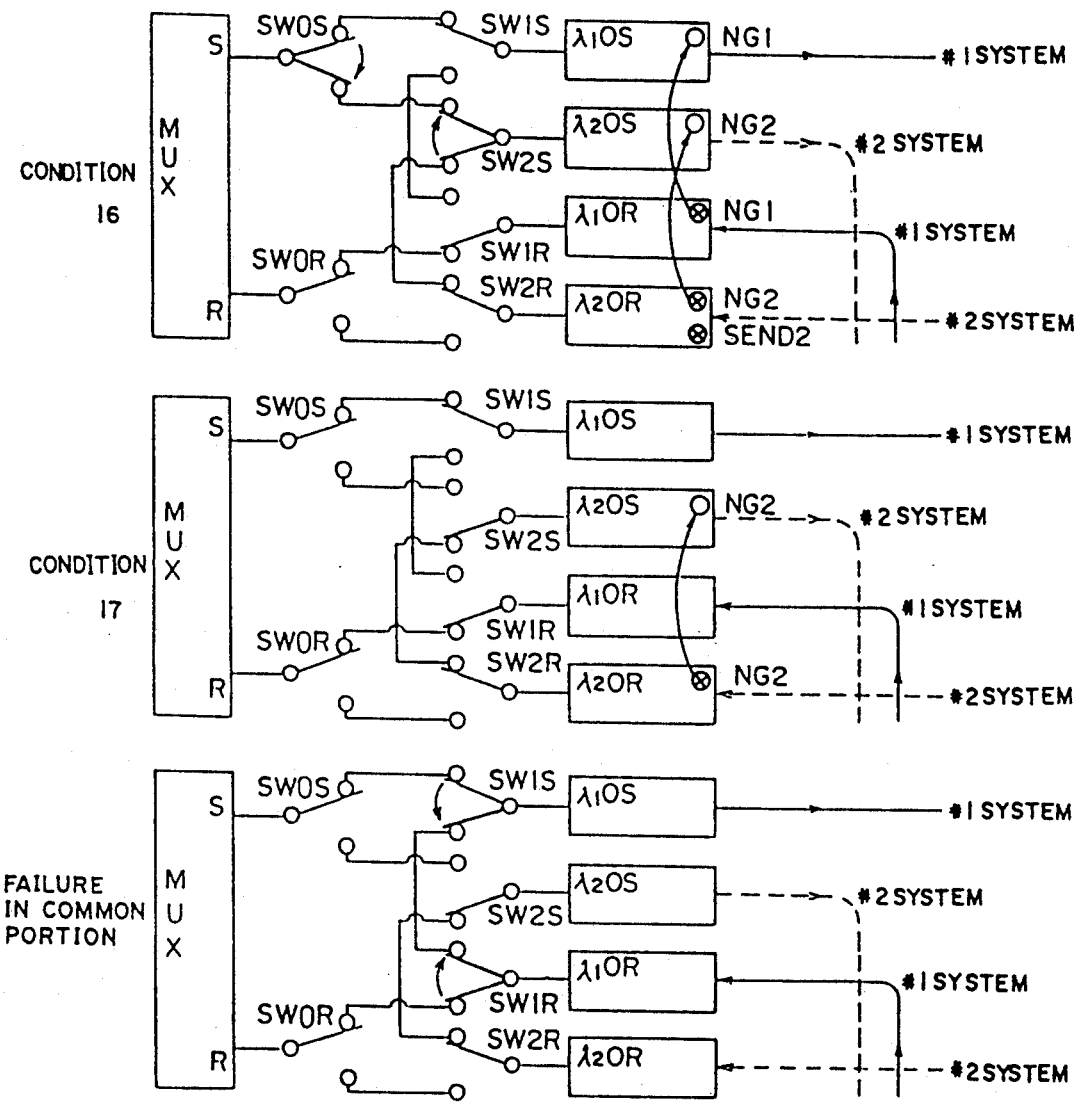

At the bottom of FIG. 5E is illustrated a case where a failure occurs in a communication node when the #1 system is employed. In this case, in order to remove the failing communication node from the network, SW1R and SW1S are switched as shown so that λ10R and λ10S are short-circuited.

Examples of actual employment of the network based on the above connecting conditions are represented by cases 1 through 9 in FIGS. 6A through 6I. The corresponding states of the whole network are illustrated in FIGS. 7A through 7I. These examples are illustrated as comprising four communication nodes A to D. The number of communication nodes is not limited to four but may be arbitrarily increased.

Figure 6A:
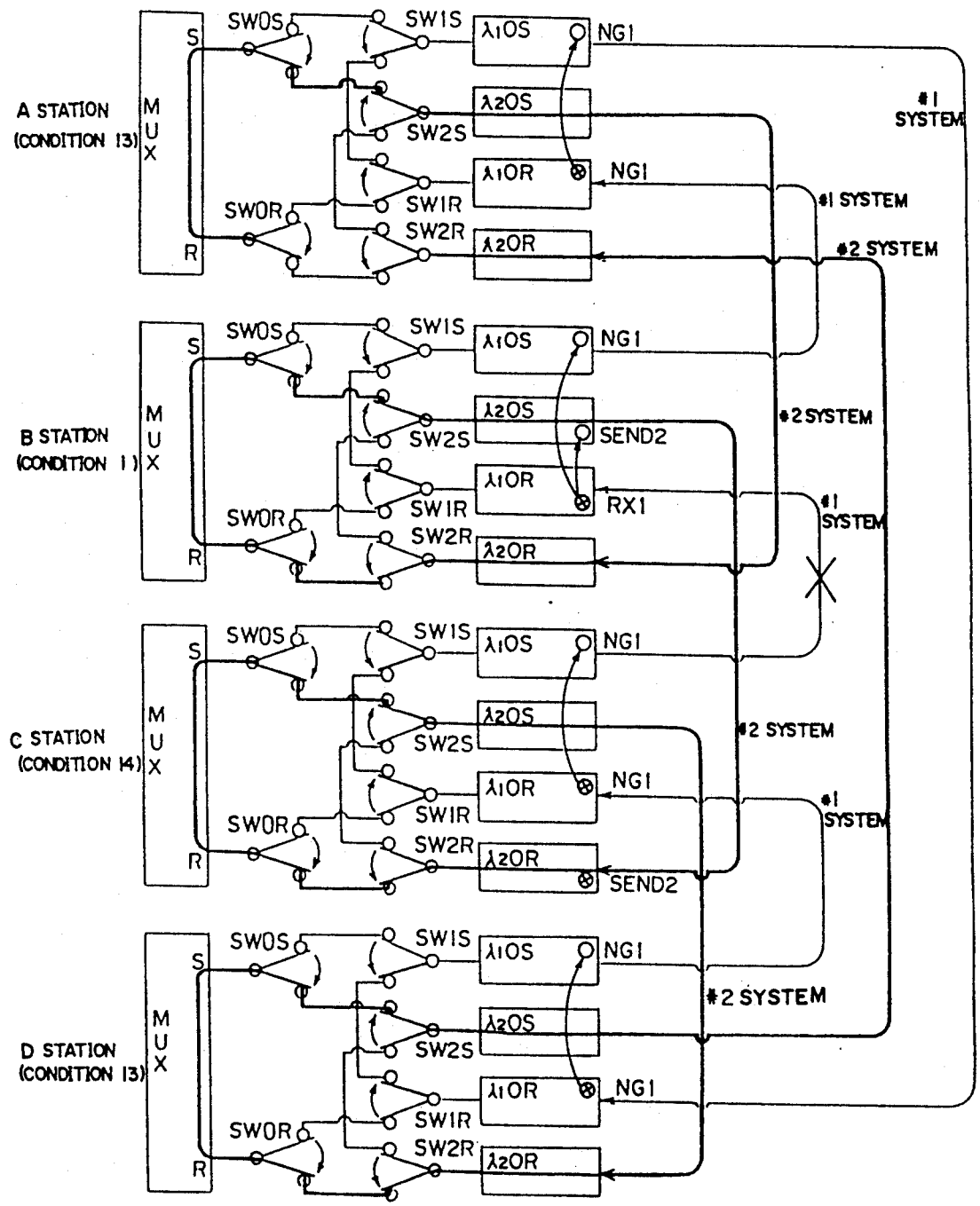

First, case 1 of FIGS. 6A and 7A represents a case where, when the #1 system transmission line is employed, a failure occurs in #1 system between B station and C station. In this case, the receive level reduced state RX1 at λ10R is detected in B station as shown in FIG. 6A so that it enters the connecting state in condition 1 of FIG. 5A. As a result, failure information NG1 is sent from B station to A station over the #1 system transmission line and return information SEND2 is returned from B station to C station over the #2 system transmission line. Furthermore, failure information NG1 is transferred from station to station, i.e., from A station to D station and from D station to C station. As a result, A station placed in the connecting state of condition 13 of FIG. 5D and station C is placed in the connecting state of condition 14 of FIG. 5D. By such an independent operation in each communication node, the transmission line is switched from #1 system to #2 system for employment of the network, as indicated by the bold lines in FIG. 6A or FIG. 7A.

Figure 6B:
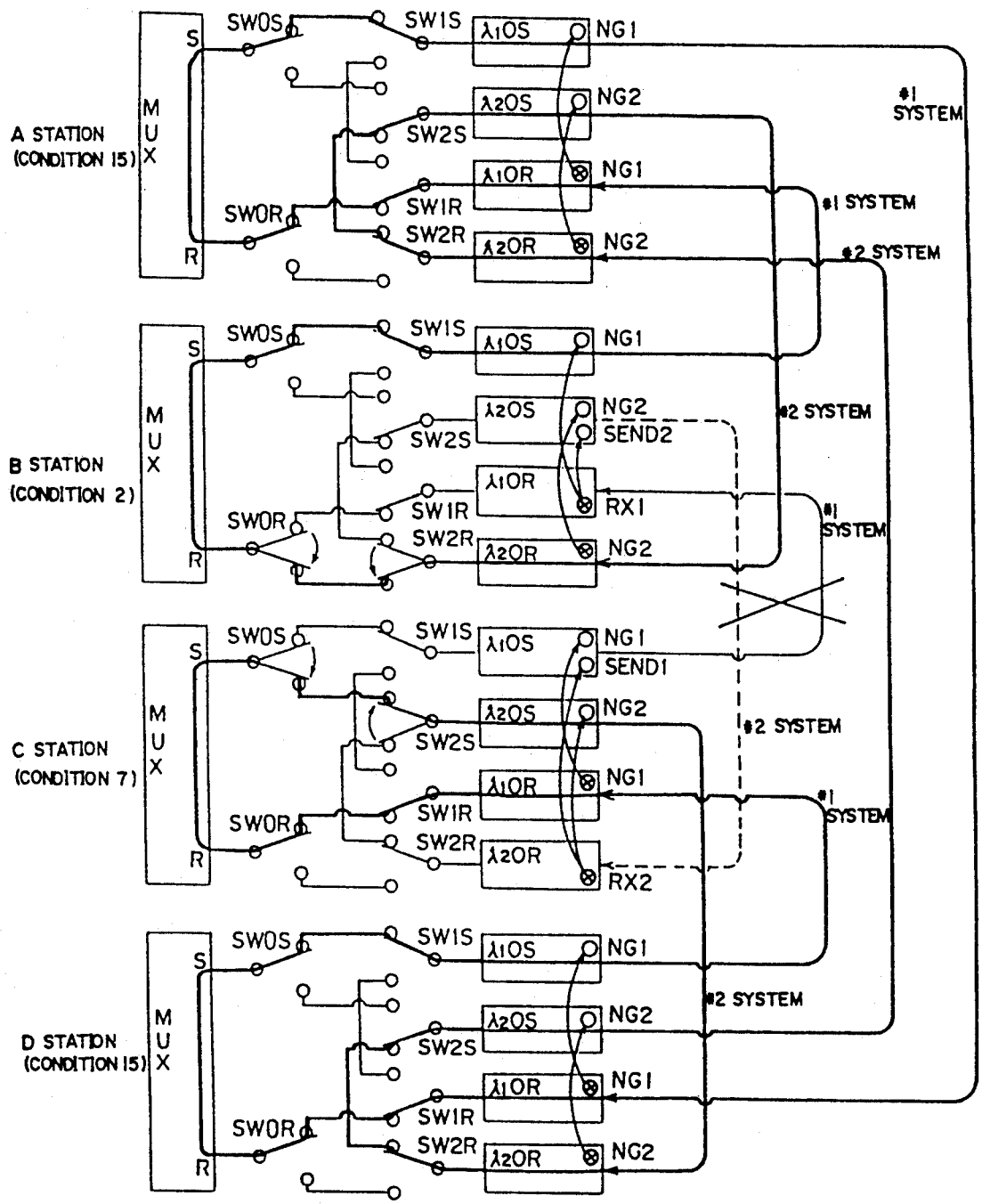
Figure 6C:
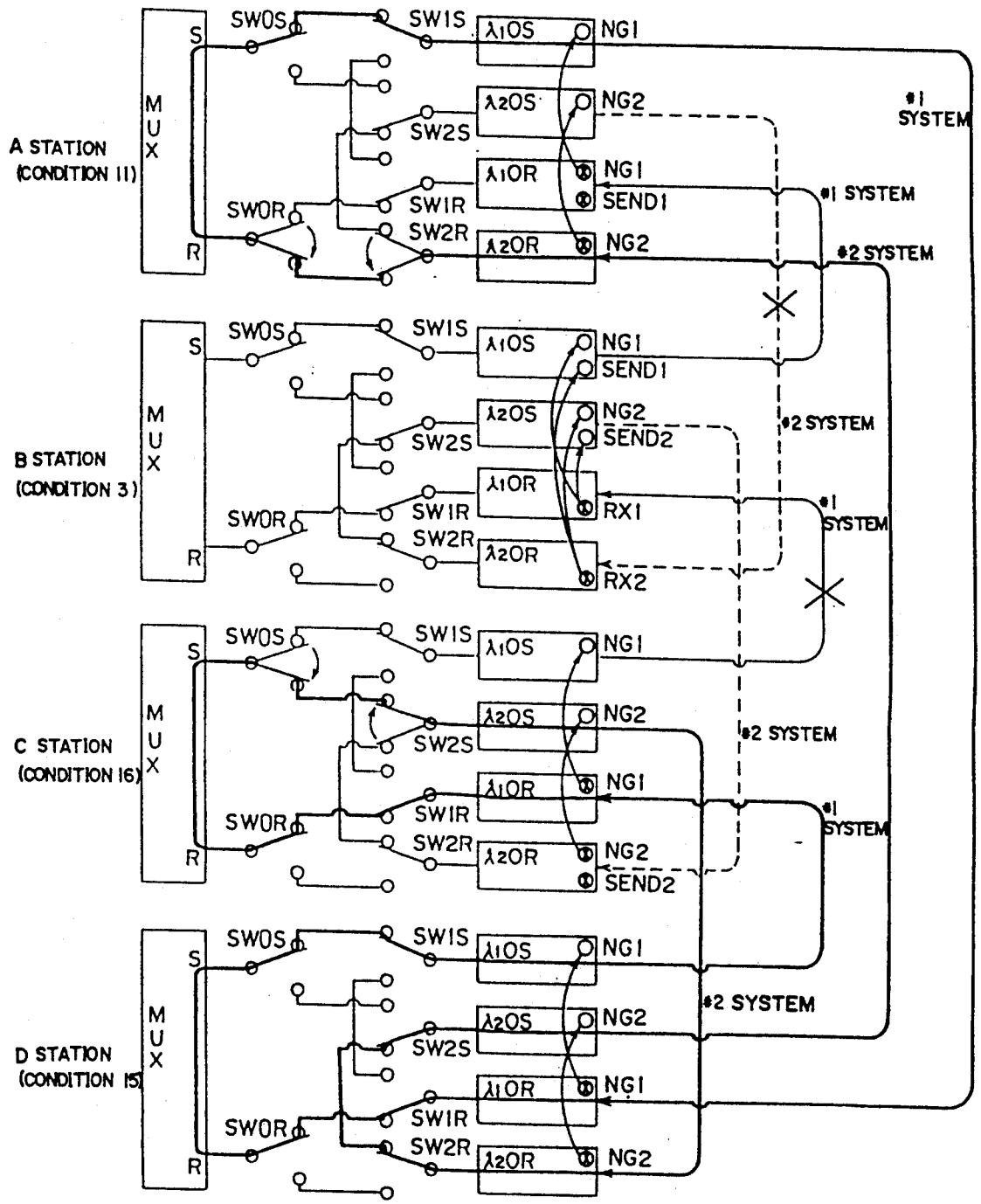
Figure 6D:
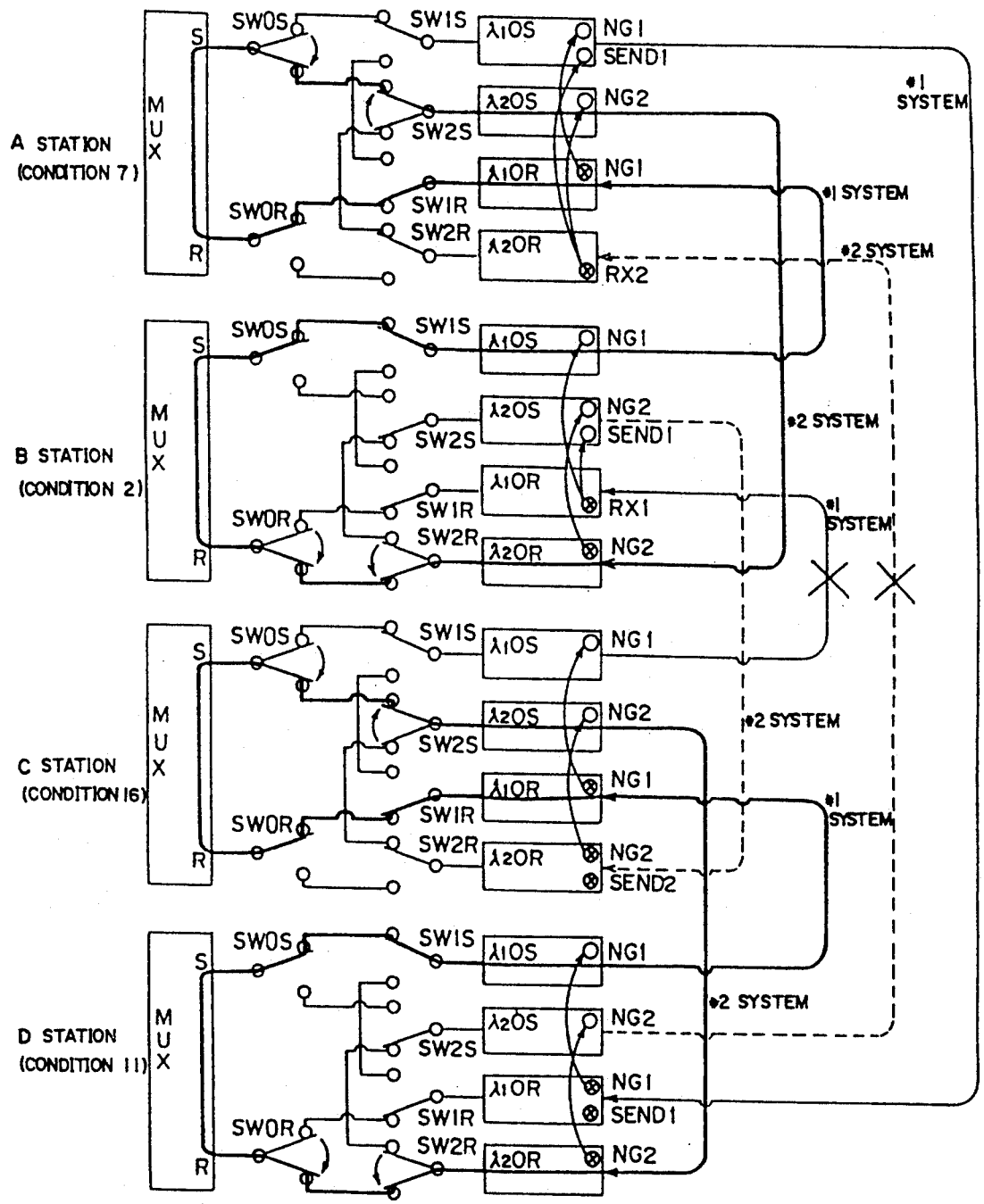
Figure 6E:
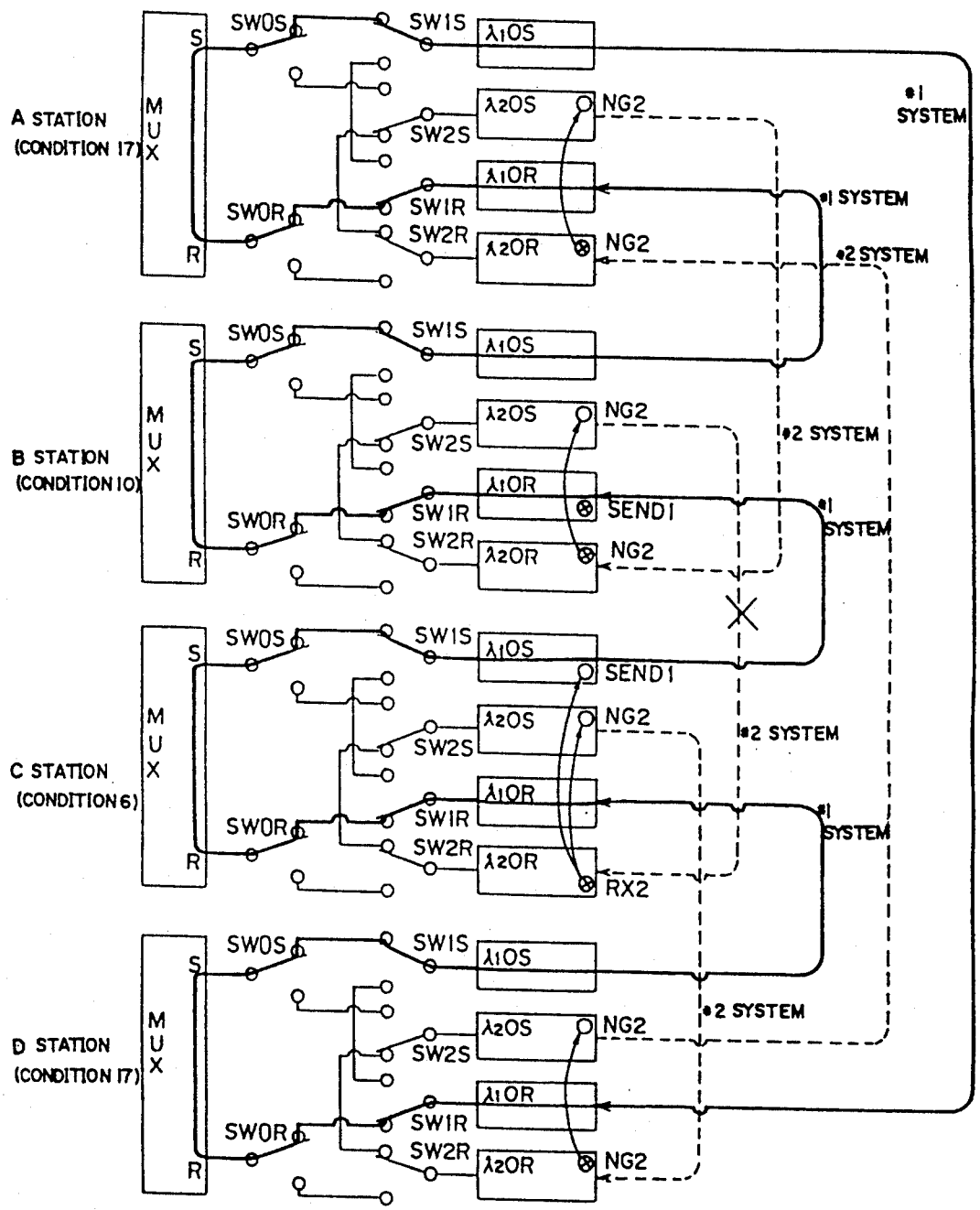
Figure 6F:
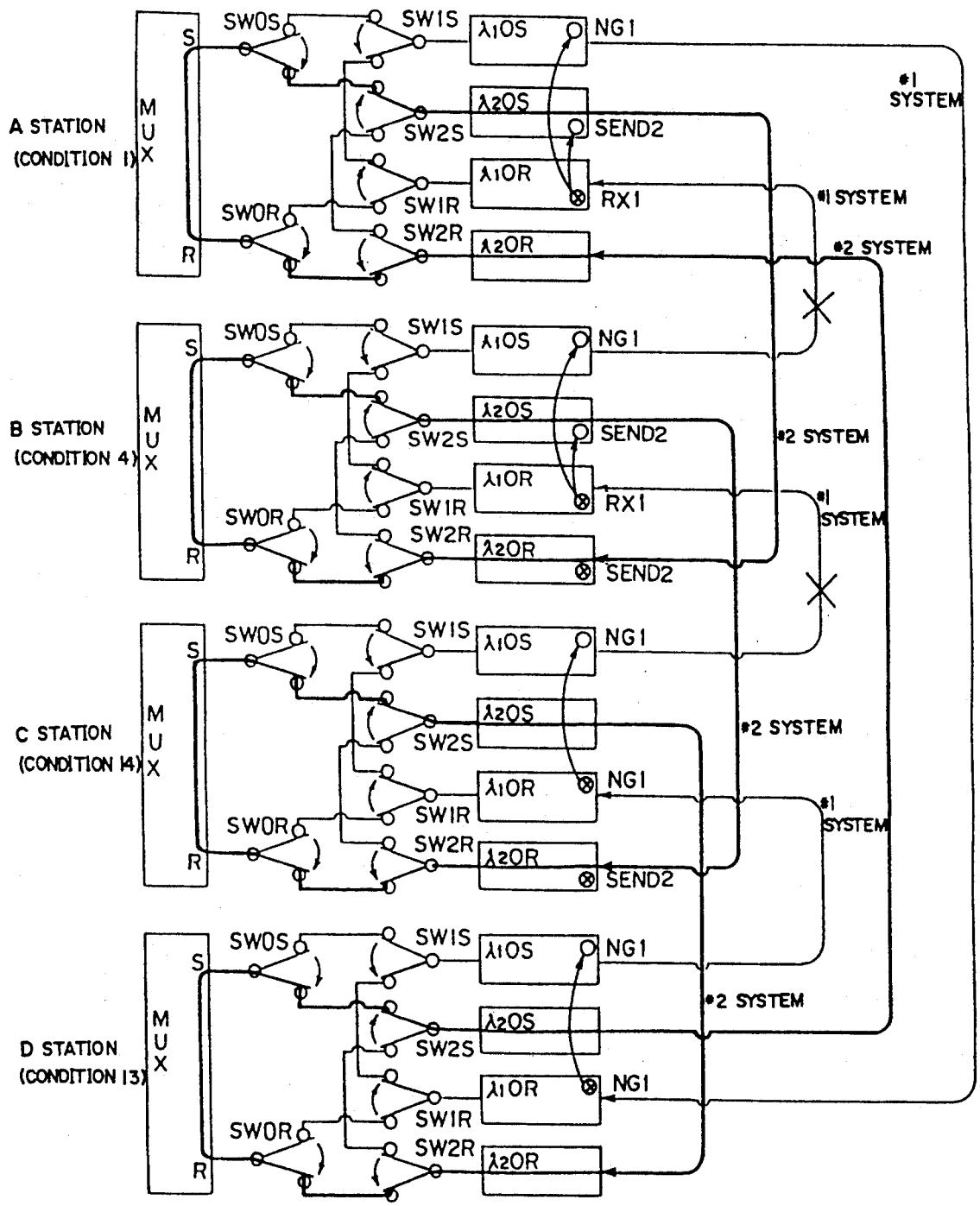
Figure 6G:
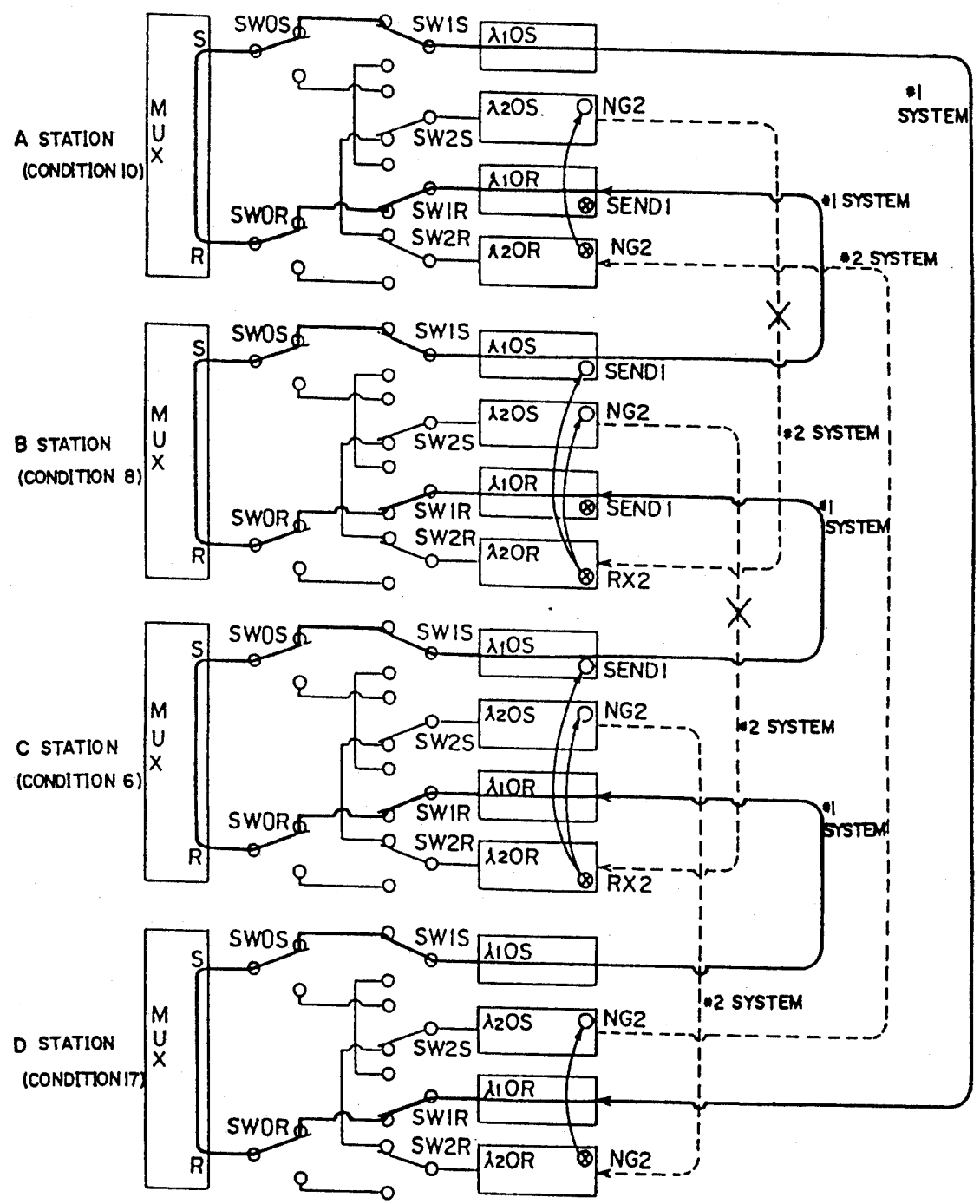
Figure 6H:
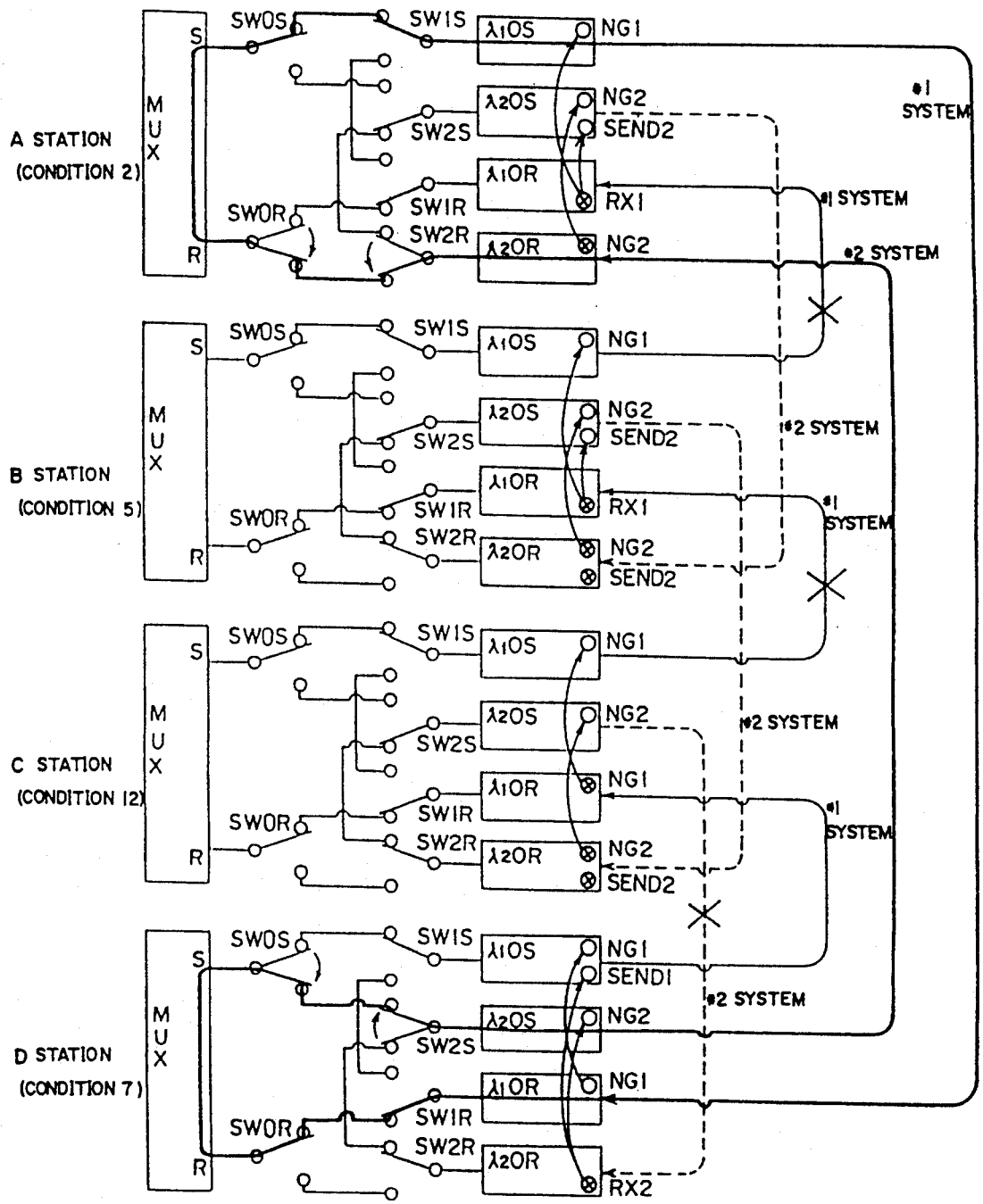
Figure 61:
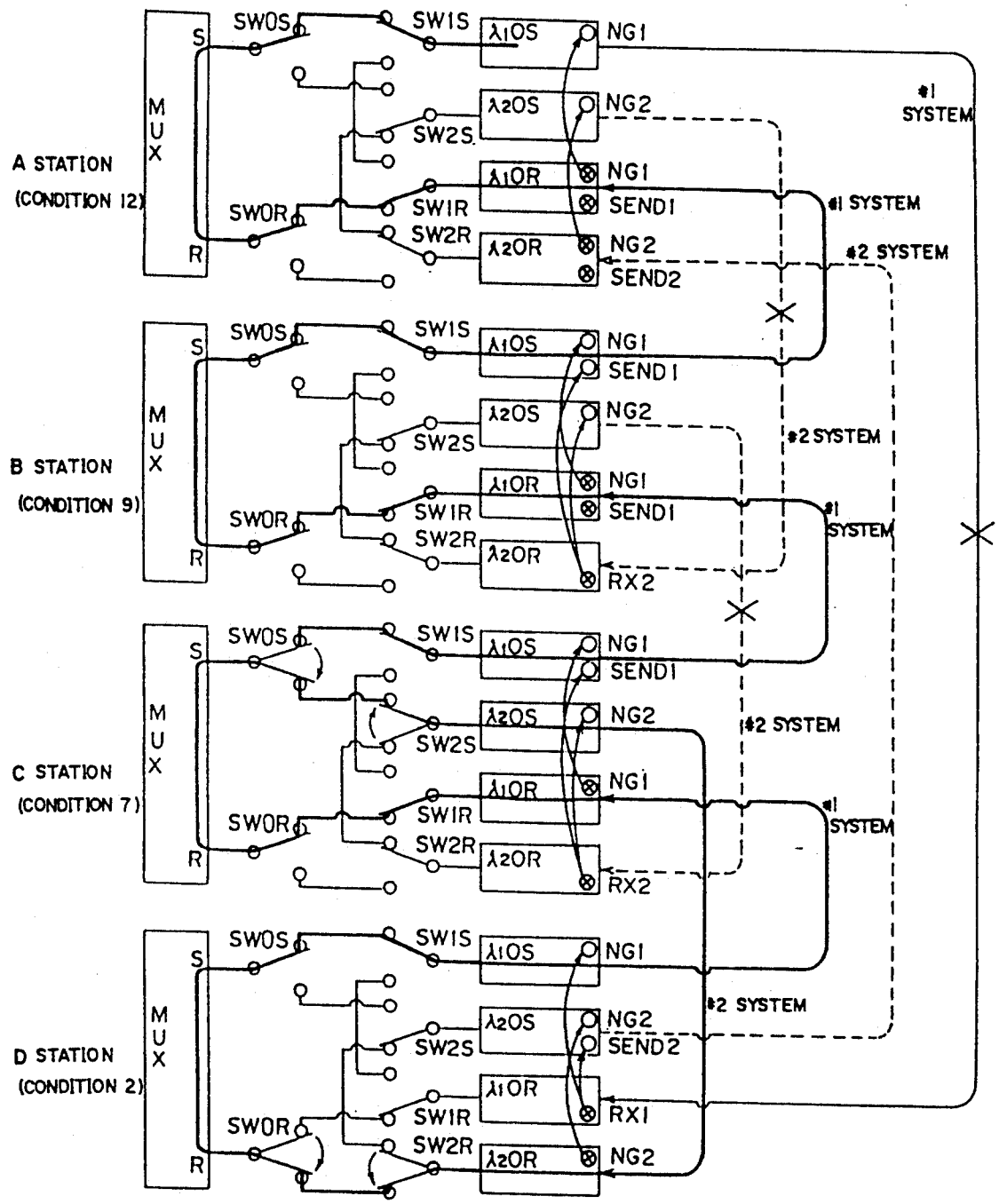

Case 2 of FIGS. 6B and 7B corresponds to a case where failures occur in both the #1 and #2 systems between B station and C station at the time of network employment by use of the #1 system transmission line. In this case, as shown in FIG. 6B, the receive level reduced state RX1 at λ10R is detected in B station and the receive level reduced state RX2 at λ20R is detected in C station. As a result, A station and D station operate in an interlocking manner so that they enter the connecting state of condition 15 of FIG. 5D. B station enters the connecting state of condition 2 of FIG. 5A and C station enters the connecting state of condition 7 of FIG. 5B. By such independent operation in each communication node, the transmission line is looped from the #1 system back to the #2 system in C station and from the #2 system back to the #1 system in B station as indicated by the bold lines in FIG. 6B or FIG. 7B. Thus, an alternative route is established as shown in FIG. 7B to circumvent the failed portions.

Other cases 3 through 9 of FIGS. 6C through 6I or FIGS. 7C through 7I may be similarly considered.

THE SECOND PREFERRED EMBODIMENT

Figure 8:
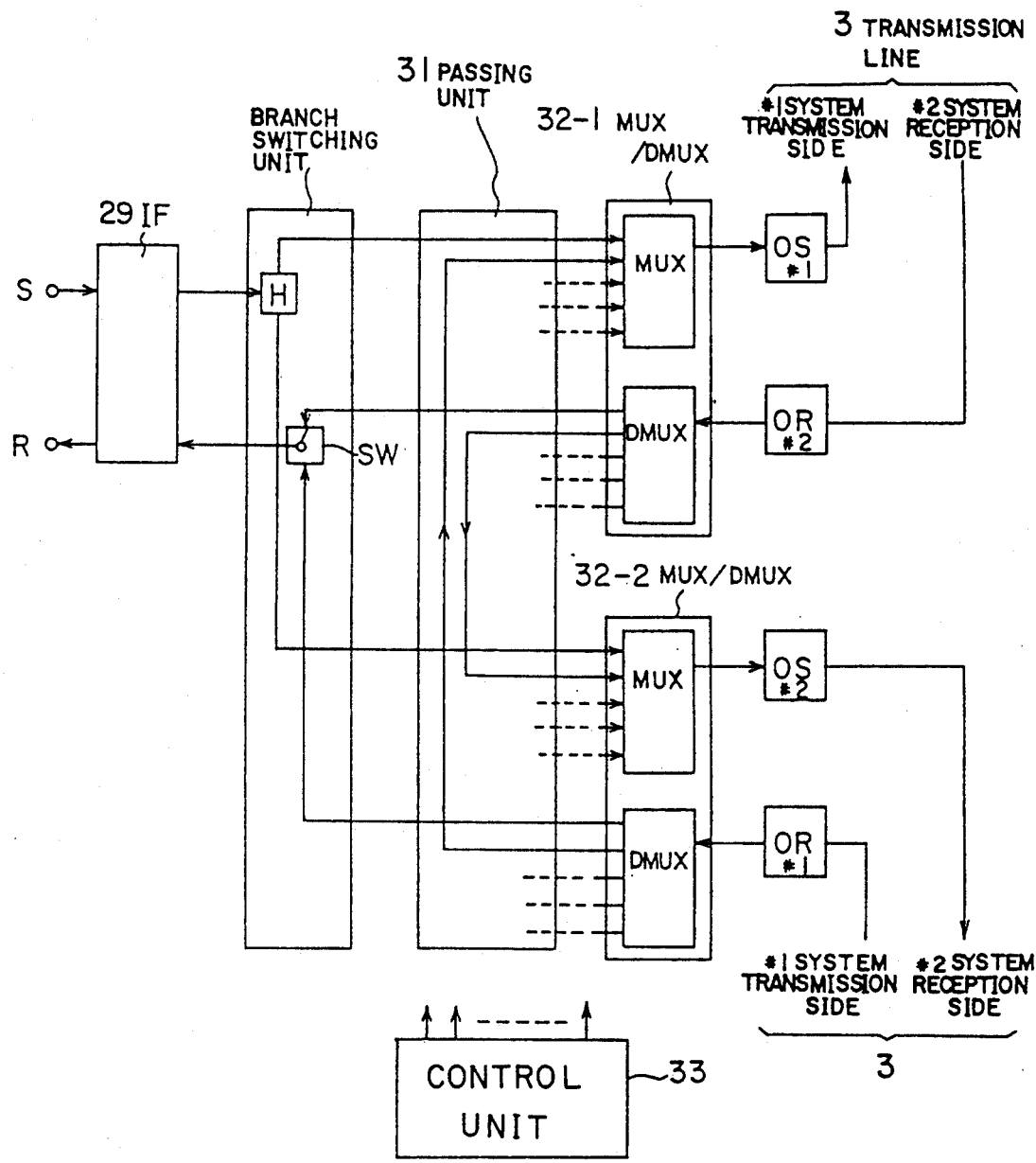
FIG. 8 is a block diagram of a second embodiment of the present invention.

FIG. 8 shows a configuration of the second preferred embodiment of the present invention. This embodiment, which is similar to the first preferred embodiment, shows the configuration of one of the communication nodes IN2-1 to IN2-5 in a general ring type LAN shown in FIGS. 1A to 1C.

In FIG. 8, OS#1, OS#2, OR#1 and OR#2 are respectively the same as $\lambda 10S$, $\lambda 20S$, $\lambda 10R$ and $\lambda 20R$ in the first preferred embodiment shown in FIG. 3. Accordingly, transmission line 3 (which should be referred to in FIGS. 1A to 1C) comprises an optical fiber cable in which the transmission side of the #1 system and the receiving side of the #2 system, the receiving side of the #1 system and the transmission side of the #2 system are optical-wavelength multiplexed. Needless to say, the #1 and #2 systems may be formed of separate optical fiber cables. The circuit corresponding to WDM 27-1 and 27-2 of the first preferred embodiment may be omitted.

The second preferred embodiment does not have a circuit corresponding to RSW 25 of the first preferred embodiment shown in FIG. 3 and the input side of OS#1 and OS#2 and the output side of OR#1 and OR#2 are connected to MUX-DMUX 32-1 and 32-2. MUX-/DMUX 32-1 and 32-2 perform multiplexes or demultiplexes by using time divisional multiplexed signals having transmission speeds of 32 Mbps, forming an input and output at passing portion 31 and an input and output at OS#1, OS#2, OR#1 and OR#2 in the same manner as MUX/DMUX 24 in the first preferred embodiment shown in FIG. 3.

Passing portion 31 determines to which of 480 channels of a time divisional multiplexing signal having a transmission speed of 32 Mbps in MUX/DMUX 32-1 or 32-2 the input and output signal at branch switching portion 30 is assigned. In the unassigned channels, the receiving side input from MUX/DMUX 32-1 is relayed to the output of the transmission side to MUX/DMUX 32-2. Conversely, the input of the receiving side from MUX/DMUX 32-2 is relayed to the output of the transmission side to MUX/DMUX 32-1. In this embodiment, the unit in which the above assignment is performed is not limited to a single channel unit but comprises an HG unit, as described later.

Branch switching unit 30 is the most characteristic portion of the present embodiment and comprises a hybrid output portion H and a receive switching portion SW.

Hybrid output portion H comprises a circuit for outputting the transmission output from IF 29 to two systems. Thus, the transmission output is transmitted to MUX/DMUX 32-1 and the transmission line of the #1 system through OS#1. The transmission output is also transmitted from a passing portion 31 to MUX/DMUX 32-2 and the transmission line of #2 system through OS#2.

Receive switching portion SW selects one of the receiving input from the #1 system receiving side through MUX/DMUX 32-1 and passing portion 31 and the receiving input from the #2 system receiving side through MUX/DMUX 32-1 and passing portion 31 and outputs the selected input to IF 29.

IF 29 is an interface circuit for performing a connection between a transmission signal S or a receive signal R for a terminal not shown and branch switching portion 30 in the same manner as IF in the first preferred embodiment shown in FIG. 3.

Control unit 33 performs a whole control of IF 29, branch switching portion 30, passing portion 31, MUX-/DMUX 32-1, 32-2, OS#1, OS#2, OR#1 and OR#2 of the above structure.

The operation of the second preferred embodiment with the above structure will be explained hereinafter.

The respective communication shown in FIG. 8 in the present embodiment autonomously performs a switching of a transmission line 3 between #1 system and #2 system, thereby reconstructing the network. The connection logic is simple. Control unit 33 performs a supervision to determine whether or not the receiving signal of an optical signal is normally received. Where an alarm of a receive input is detected in OR#1, control unit 33 enables a switching of receive switching unit SW in branch switching unit 30 to select a receive input from MNUX/DMUX 32-1. Conversely, where a receive input alarm is detected at OR#2, receive switching portion SW in branch switching unit 30 is switched to select a receive input from MUX/DMUX 32-2. The signal transmitted on transmission line 3 is a time divisional multiplexing signal of 480 channels having a transmission speed of 32 Mbps. Six of these 480 channels form a unit of HG. The embodiment has a receiving alarm in an HG unit and performs a switching in an HG unit. Connection of passing portion 31 with IF 29 side is also performed in an HG unit and, for example, HG1 may be connected to IF 29 and HG2 HG80 merely relay by MUX/DMUX 32-1 and 32-2.

An autonomous control is completed at respective communication nodes by the above simple switching logic only. Namely, the first preferred embodiment controls a switching of both transmission and receive sides in RSW 25 in accordance with failure information. However, the second preferred embodiment uses only an alarm on the receiving side for failure information and thus switches the receiving side to either #1 system or #2 system.

Examples of actual network operation are shown by cases 1 to 6 in FIGS. 9A to 9F. As in the first preferred embodiment, FIGS. 9A to 9F show cases of four communication nodes comprising A station to D station. However, the number of communication nodes is not limited to four and may be discretional.

Figure 9A:
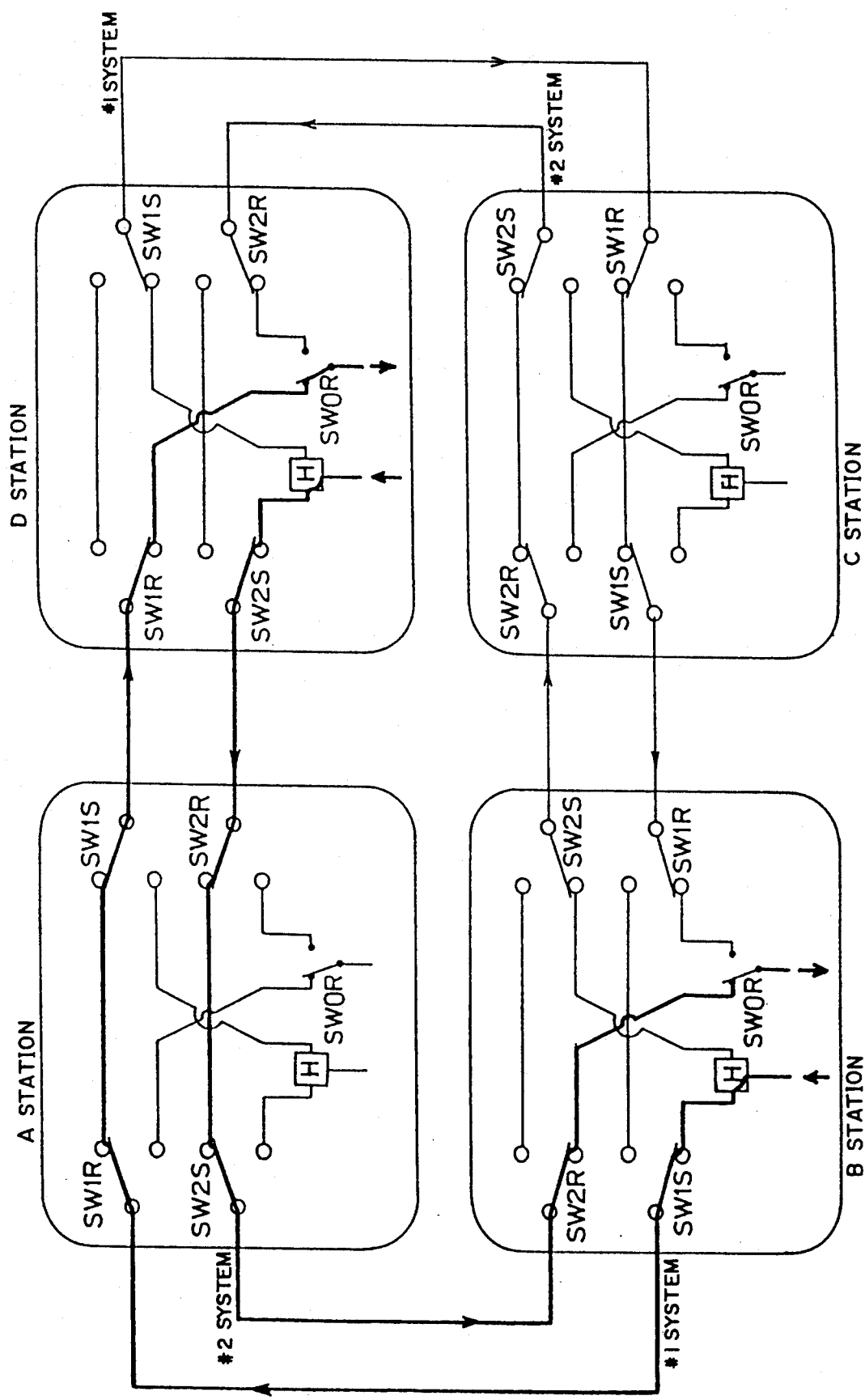
FIGS. 9A through 9F illustrate inter-station connecting states in the second embodiment.

FIG. 9A designates a case 1 in which a normal operation is performed and in which a data communication is mutually performed between B station and D station. The present embodiment performs a communication using both transmission lines where #1 system and #2 system are in a normal state. In FIG. 9A a portion designated by "H" corresponds to a hybrid outputting section H in FIG. 8 and SW, OR correspond to a receiving switching unit SW. SW1S, SW2S, SW1R and SW2R, respectively, conceptionally show a state of connection of a transmit and receive signal in passing portion 31. As shown by the bold line in FIG. 9A, in a normal state, the communication data from B station is output from hybrid outputting portion H to a transmission line of #1 system through SW1S and is input to A station. A station relays the communication data through SW1R and SW1S to D station. D station receives the communication data input through a transmission line of #1 system from A station via SW1R to SW0R. Conversely, the communication data from D station is output from hybrid output portion H to a transmission line of #2 system through SW2S and input to A station. A station merely relays the communication data through SW2R and SW2S and inputs the communication data into B station. B station receives the communication data input through a transmission line of #2 system from D station via SW2R to SW0R.

Figure 9B:
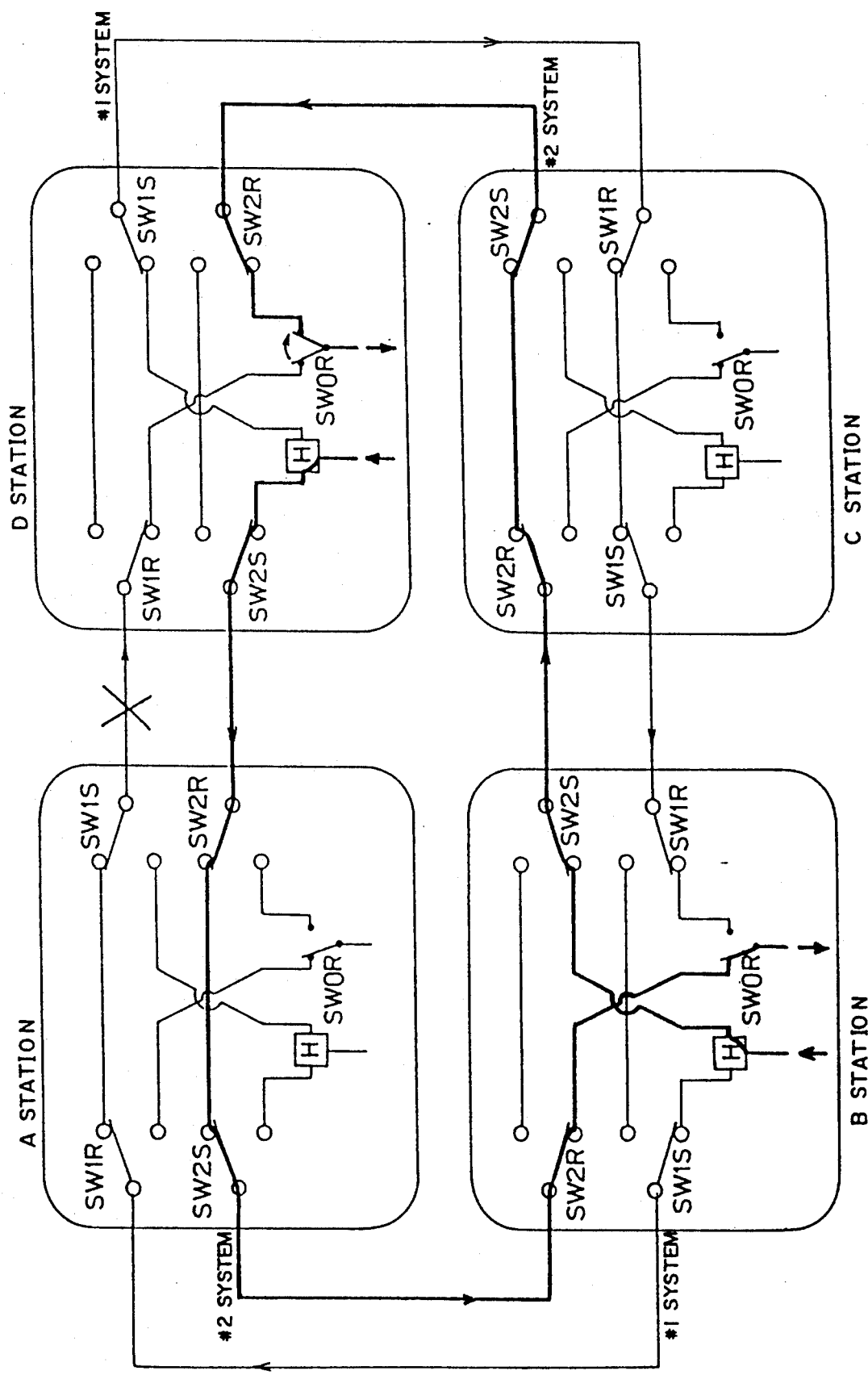

Next, a case where a failure occurs is explained. Case 2 shown in FIG. 9B shows a case in which a failure occurs between A station and D station of #1 system in the normal state of the case 1. In this case, as shown in FIG. 9B, an alarm received at OR#1 (FIG. 8) is detected at D station and SW0R (receiving switching SW in FIG. 8) is therefore switched from #1 system to #2 system. Accordingly, the communication data from D station to B station is transmitted as shown by the bold line in FIG. 9B, using the transmission line of #2 system in the same manner as in FIG. 9A. Conversely, the communication data from B station to D station is output from hybrid output portion H of B station to the transmission line of #2 system through SW2S as shown by the bold line and is input to C station. The communication data is relayed through SW2R and SWSR of C station and input to D station. Therefore, the communication data from B station is received by D station through the transmission line of #2 system and through SW2R and SW0R and is received by D station. In this case, D station automatically outputs the communication data from hybrid outputting portion H to the transmission lines comprising #1 system and #2 system and it is not necessary to switch from #1 system to #2 system on the transmission side. Therefore, a failure on the transmission line in #1 system between A station and D station is avoided.

Figure 9C:
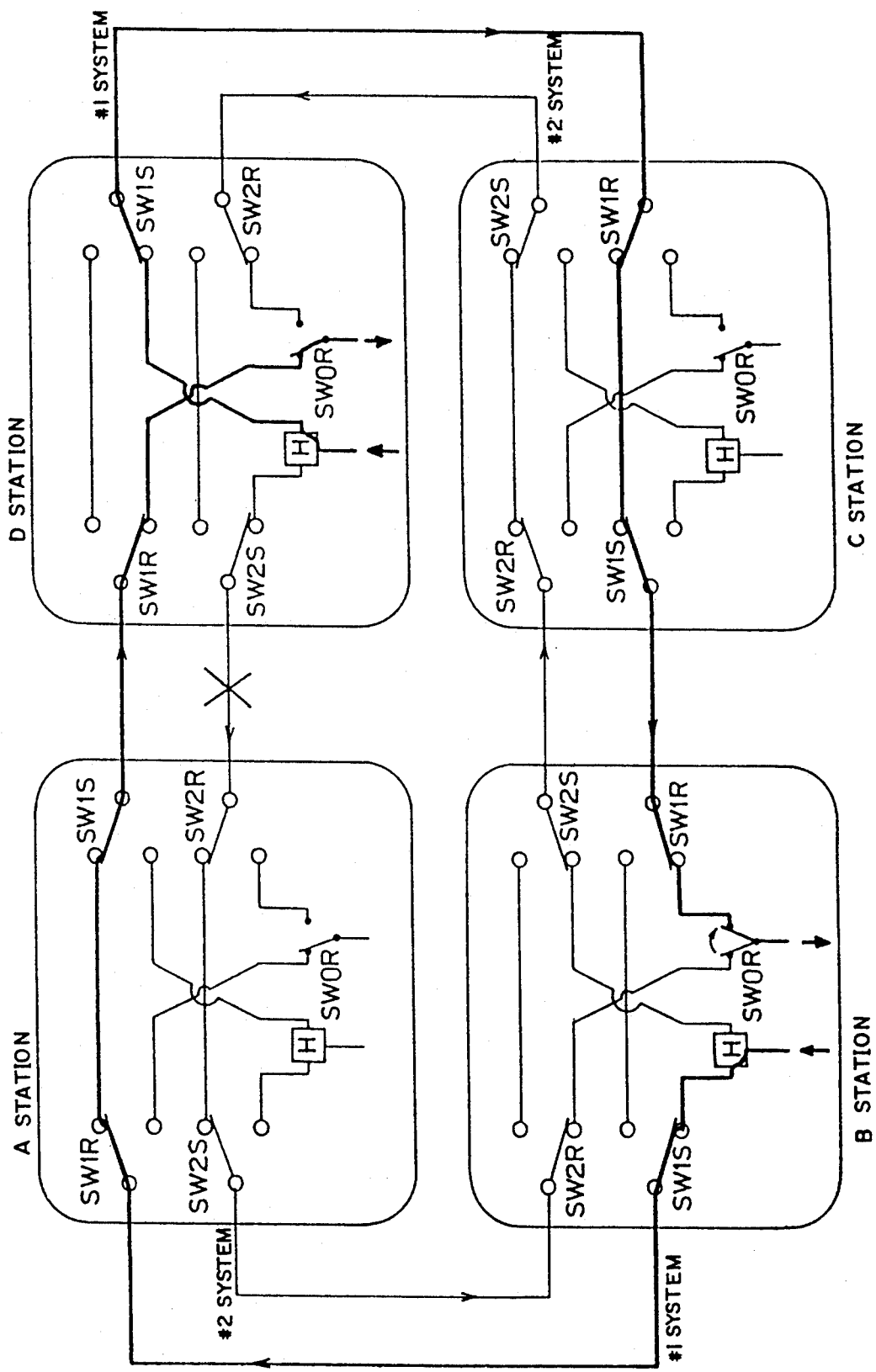

The case 3 shown in FIG. 9C designates the case where a failure occurs between A station and D station in #2 system in the case 1 designating the normal state. In this case, the receive alarm is detected in B station and SW0R is switched from #2 system to #1 system, thereby enabling the communication data from D station to B station to be transmitted along the transmission line designated by a bold line in FIG. 9C.

Figure 9D:
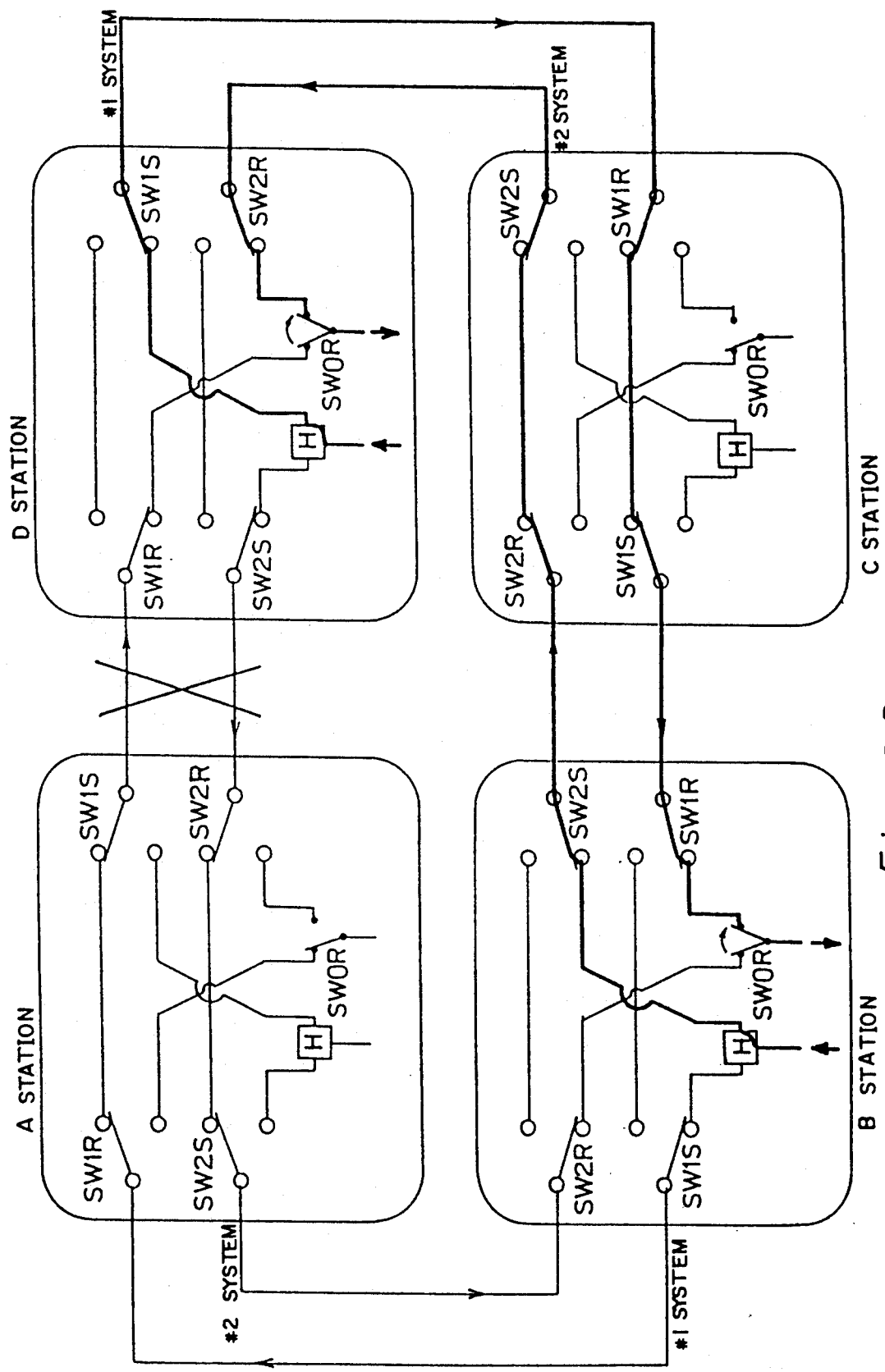

On the other hand, in case 4, shown in FIG. 9D, a failure occurs on a transmission line of both #1 system and #2 system between A station and D station in the normal state of case 1. In this case, as shown in FIG. 9D, a receive alarm is detected at OR#1 (FIG. 8) in both B and D stations. As a result, SW0R of both stations (receive switching unit SW in FIG. 8) is switched from #1 system to #2 system. Therefore, both the communication data from B station to D station and the communication data from D station to B station are both switched from #1 system to #2 system as shown by the bold line in FIG. 9D. Therefore, the transmission line failure in both #1 system and #2 system between A station and D station is avoided.

Figure 9E:
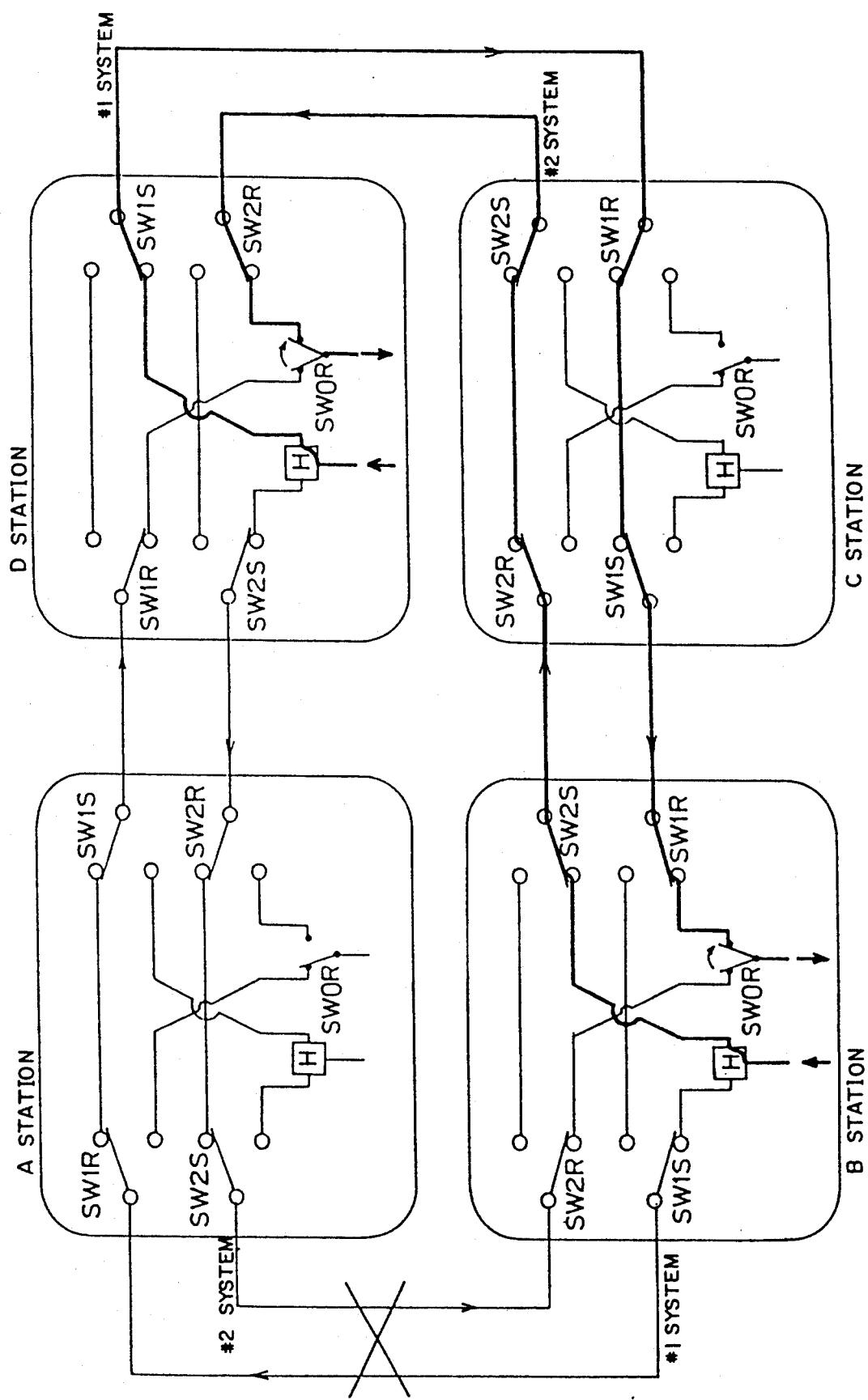

Case 5 shown in FIG. 9E designates the case where a failure occurs on both transmission lines for #1 system and #2 system between A station and B station in the case 1 designating the normal state. In this case, the receive alarm is detected in B station and D station and thus both SW0Rs are switched from #1 system to #2 system. Accordingly, both communication data from B station to D station and communication data from D to station to B station are switched to a path designated by a bold line shown in FIG. 9E.

Figure 9F:
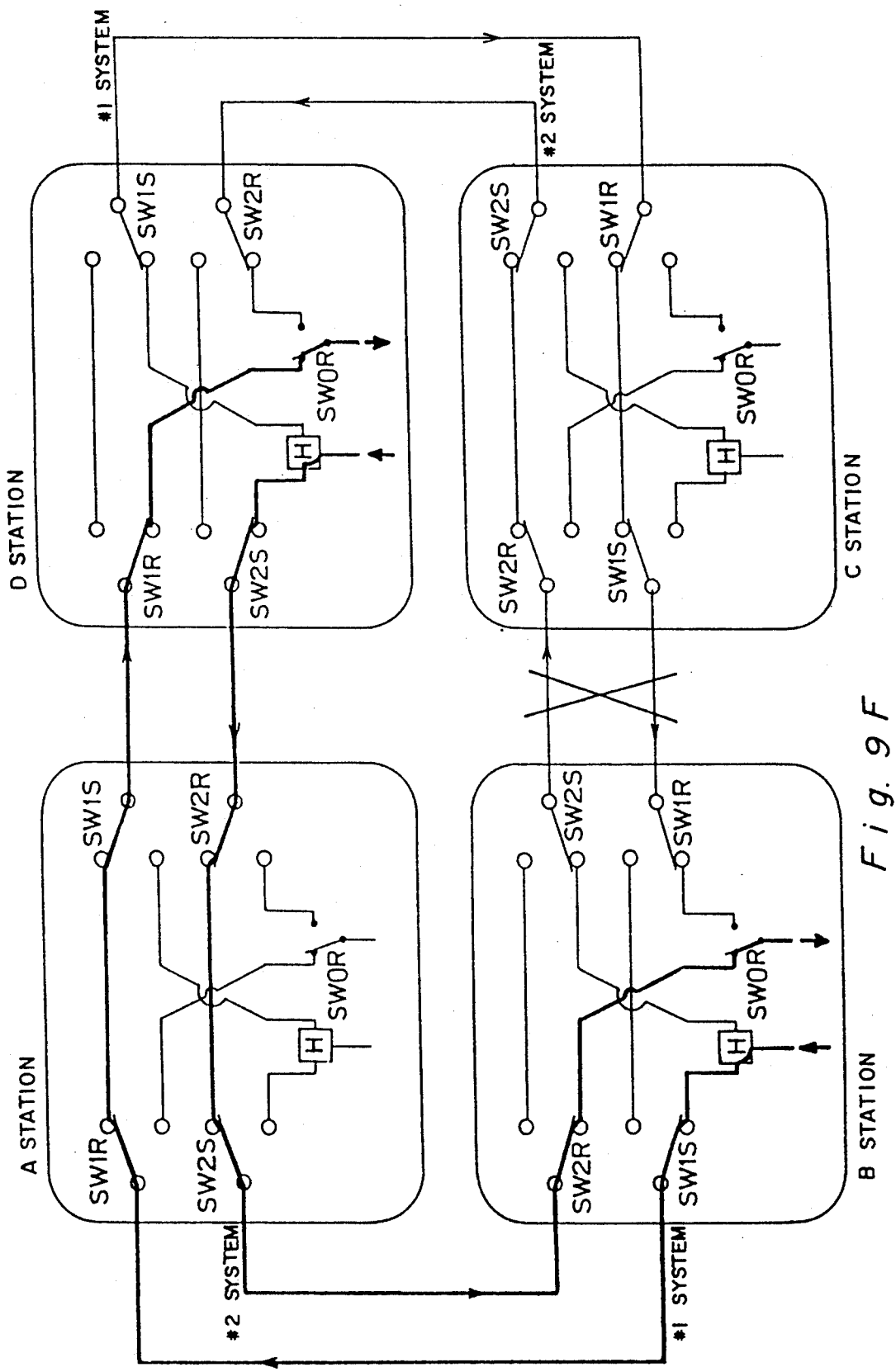

Further, the case 5 shown in FIG. 9F designates the case where a failure occurs in both #1 system and #2 system between B station and C station in the case 1 designating the normal state. In this case, both communication data from B station to D station and communication data from D station to B station need not switch the data communication lines.

OTHER PREFERRED EMBODIMENTS

Figure 10:
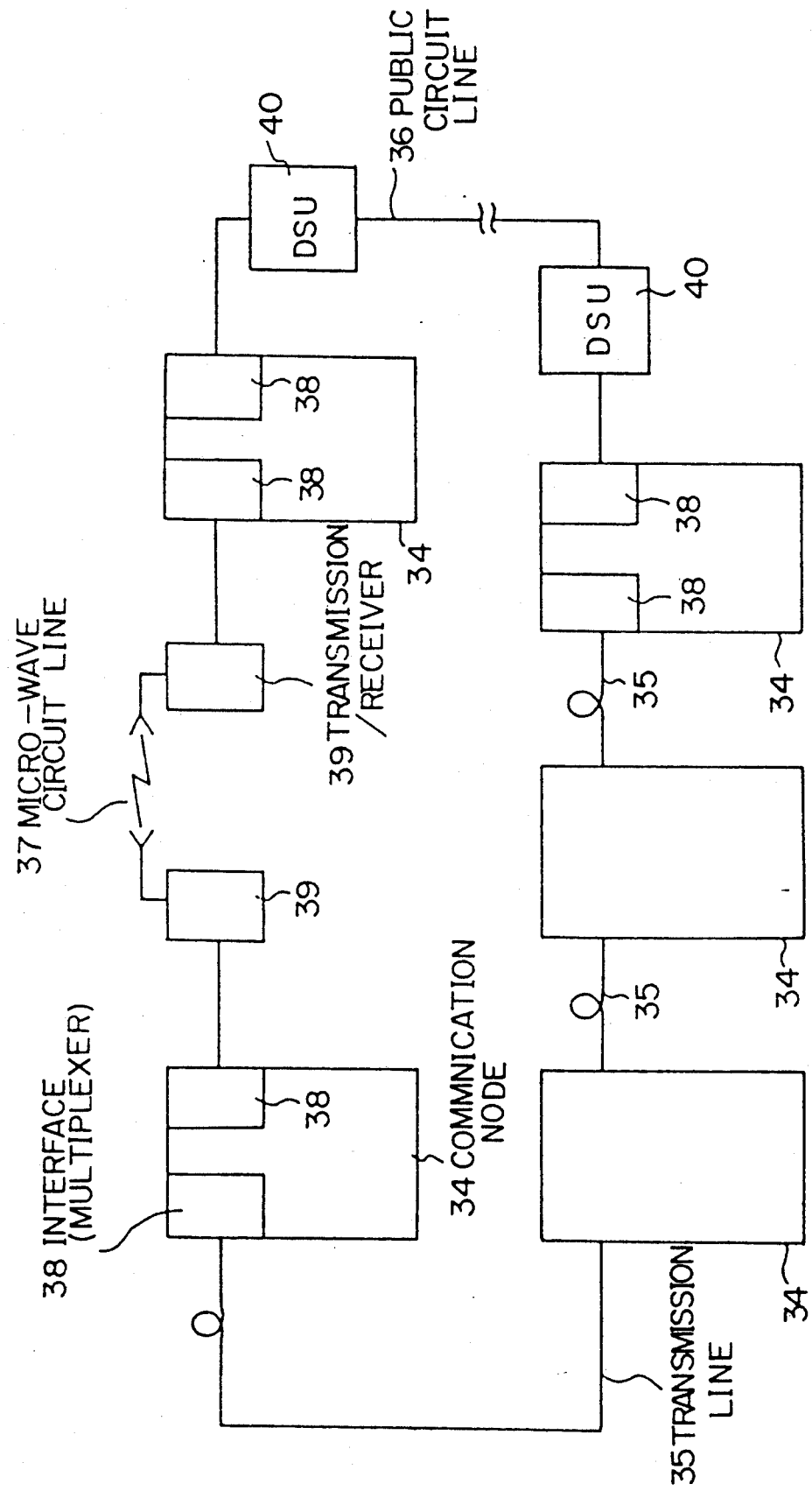
FIG. 10 illustrates a general configuration of a third embodiment of the present invention.

FIG. 10 shows a view of the whole structure of the third preferred embodiment formed as an application of the first and second preferred embodiments. As shown in FIG. 10, a microwave circuit line 33 through transmitter and receiver 39 and a public circuit line 36 through DSU 40 may be provided in a network within communication node 34 in addition to a normal transmission line 35. In this case, an interface operation with an external apparatus is performed by an interface apparatus (multiplying apparatus) 38.

Figure 11:
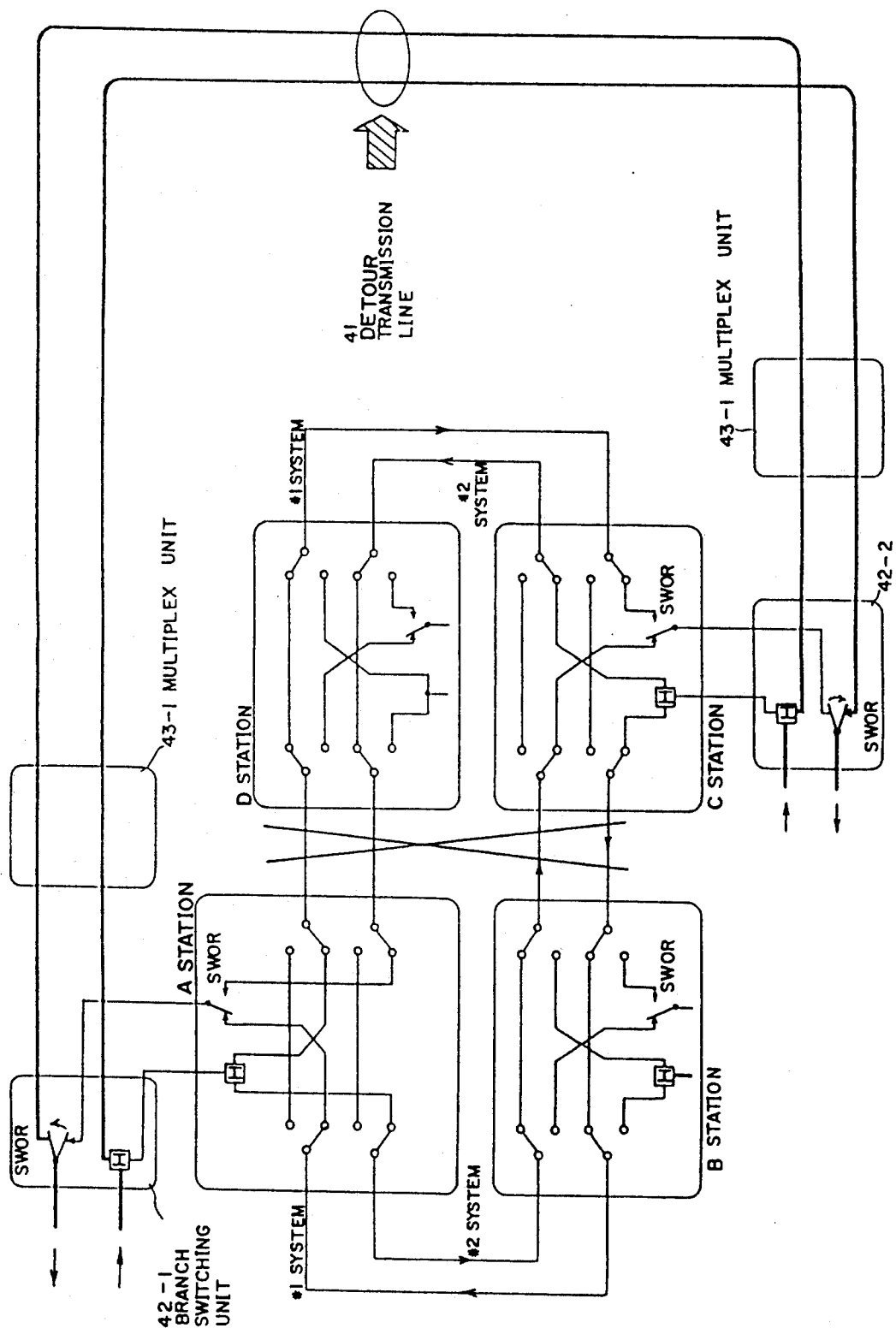
FIG. 11 illustrates a general configuration of a fourth embodiment of the present invention.

FIG. 11 shows a view of the whole structure of the fourth embodiment formed as an application of the second preferred embodiment. As shown in FIG. 11, a detour transmission line 41 is provided between predetermined stations, for example, between A station and C station, in addition to a normal ring-type transmission line of #1 system and #2 system. Branch switching portion 42-1 is provided at A station and branch switching portion 42-2 is similarly provided at C station and there connected by multiplexing portions 43-1 and 43-2. In A station, the transmission data on the transmission side are output to detour transmission line 41 through hybrid outputting portion H in branch switching portion 42-1 and are transmitted to both the normal transmission lines of #1 system and #2 system through hybrid outputting portion H in A station. The same applies to C station side. As shown in FIG. 11, where a transmission line failure occurs between A station and D station, between B station and C station and in both #1 system and #2 system, the receive alarm is detected in A and C stations by both OR#1 and OR#2 (which should be referred to in FIG. 8 and is provided in SW0Rs in A and C stations), and control portion 33 (which should be referred to in FIG. 8) within A station and C station controls to switch respective SW0R in receive switching portion SW (which should be referred to FIG. 8) in branch switching portions 42-1 and 42-2 in FIG. 11. Therefore, the failure between A station and C station can be avoided, enabling the detour connection to be performed.

We claim:

1. A ring network switching control device for use with a ring network in which each of a plurality of communication node is connected in a ring via a duplexed transmission line, each communication node comprising:

control information transmitting means for transmitting control information representing a state of an associated transmission line to another communication node via the transmission line;

control information receiving means for supervising the state of the associated transmission line and for receiving control information from another communication node via the associated transmission line;

transmission line switching means for switching a connection state of the associated transmission line; and control means for prompting said transmission line switching means to perform switching control and the control information transmitting means to transmit new control information in accordance with predetermined rules based on results of the supervision of the state of the transmission line and the reception of the control information by the control information receiving means so that each of said communicatin nodes performs a distributed control in accordance with a change of a state of the network.

2. The ring network switching control apparatus according to claim 1, wherein said transmission line switching means includes means for performing a switching to determine the transmission line for which an input operation of receiving data is performed or for which an output operation of transmission date is performed, a switching to pass communication data along a transmission line by short-circuiting an input side and output side for both transmission lines or either of the transmission lines, or a switching to loop back one transmission line to the other transmission line.

3. The ring network switching control apparatus according to claim 1, wherein said control means has a table for determining a switching rule for said transmission line switching means and a transmission instruction rule for new control information for said control information transmission means and includes means for performing said switching control and transmission instruction control of said new control information by referring to the table based on the state of supervising respective transmission lines and the received result of said control information in accordance with said control information receiving means.

4. The ring network switching control apparatus according to claim 1, wherein said control means comprises a sequential means for performing switching control for said transmission line switching means and for performing a transmission line switching means and for performing a transmission instruction control of new control information of said control information transmission means, based on supervising state of said respective transmission line by said control information receiving means and the received result of said control information.

5. The ring network switching control apparatus according to claim 1, wherein
said respective transmission lines are formed of an optical fiber cable.

6. The ring network switching control apparatus according to claim 5, wherein
the information transmitted on respective transmission lines is optically multiplexed.

7. The ring network switching control apparatus according to claim 1, wherein
the ring network comprises a local area network.

8. The ring network switching control apparatus according to claim 1, wherein said respective transmission lines include at least one of a microwave circuit line and a public circuit line.

9. A ring network switching control device used with a ring network in which each of a plurality of communication nodes is connected in a ring via a duplexed transmission line, each communication node comprising:
a hybrid output means for outputting transmission data to two transmission lines in a hybrid manner;
a supervising means for supervising an alarm on a receiving side of each transmission line;
reception switching means for switching a transmission line to enable it to receive data; and
a control means for performing switching control on the reception switching means on the basis of the supervised state by the supervising means.

10. The ring network switching control apparatus according to claim 9, wherein
said supervising means determines whether or not the node can receive the data from the transmission line of the duplex ring-type within the predetermined time period and produces an alarm to notify a failure of a transmission line when it does not receive the data within the predetermined time.

11. The ring network switching control apparatus according to claim 9, further comprising:
a switching control means for selecting a switching mode in which an input side and an output side is short-circuited for both or either of respective transmission lines to merely pass the transmission data through the transmission line or switching for looping back one of the transmission lines to the other transmission line.

12. The ring network switching control apparatus according to claim 9, wherein
said respective transmission lines are formed of an optical fiber cable.

13. The ring network switching control apparatus according to claim 9, wherein
the information transmitted on respective transmission lines are optically multiplexed.

14. The ring network switching control apparatus according to claim 9, wherein
said ring network comprises a local area network.

15. The ring network switching control apparatus according to claim 9, wherein
said respective transmission lines include either or both of microwave circuit line and public circuit line.

16. The ring network switching control apparatus according to claim 9 further comprising:
a detour transmission line between a desired communication node out of a plurality of communication nodes in addition to a duplexed-ring-type transmission line, wherein said control means transmits communication data by switching a transmission line to said detour transmission line and a failure is judged as occurring in any transmission line of the duplexed ring-type, based on the supervising state of said supervising means.

17. A ring network switching control method for use with a ring network in which each of a plurality of communication node is connected in a ring via a duplexed transmission line, the method comprising the steps of:
(a) transmitting control information representing a state of an associated transmission line to another communication node via the transmission line;
(b) supervising the state of the associated transmission line to detect faults and for receiving control information from another communication node via the associated transmission line; and (c) switching a connection state of the associated transmission line and for transmitting new control information in accordance to predetermined rules based on results of the supervision of the state of the transmission line and the reception of the control information so that each of said communication nodes performs a distributed control in accordance with a change of a state of the network.

* * * * *

UNITED STATES PATENT AND TRADEMARK OFFICE
CERTIFICATE OF CORRECTION

PATENT NO. : 5,191,579

DATED : March 2, 1993

INVENTOR(S) : Akihiro Matsushita et al.

It is certified that error appears in the above-identified patent and that said Letters Patent is hereby corrected as shown below:

Col. 2, line 62, "means" should be --section--.

Col. 3, lines 67 and 68, delete "The first principle" and insert same as subtitle at top of Col. 4.

Col. 5, line 12, delete "The second principle" and insert same as subtitle between lines 12 and 13.

Col. 6, line 41, "½" should be Greek letter --$\lambda$--.

Col. 7, line 60, "ba sis" should be --basis--.

Col. 13, line 25, "date" should be --data--; and lines 47 and 48, delete the phrase "line switching means and for performing a

UNITED STATES PATENT AND TRADEMARK OFFICE
CERTIFICATE OF CORRECTION

PATENT NO. : 5,191,579
DATED : March 2, 1993
INVENTOR(S) : Akihiro Matsushita, et. al.

It is certified that error appears in the above-indentified patent and that said Letters Patent is hereby corrected as shown below:

transmission".

Signed and Sealed this

Twenty-first Day of December, 1993

Attest:

BRUCE LEHMAN

Attesting Officer     Commissioner of Patents and Trademarks